Dec. 26, 1933.  C. E. VAUGHAN  1,941,027
BUTTON FEEDING APPARATUS
Filed July 7, 1930  20 Sheets-Sheet 1

INVENTOR.
Clarence E. Vaughan
BY
ATTORNEY.

Dec. 26, 1933.　　　C. E. VAUGHAN　　　1,941,027
BUTTON FEEDING APPARATUS
Filed July 7, 1930　　　20 Sheets-Sheet 3

INVENTOR.
Clarence E. Vaughan
BY Arthur C. Brown
ATTORNEY.

Dec. 26, 1933.  C. E. VAUGHAN  1,941,027
BUTTON FEEDING APPARATUS
Filed July 7, 1930  20 Sheets-Sheet 4
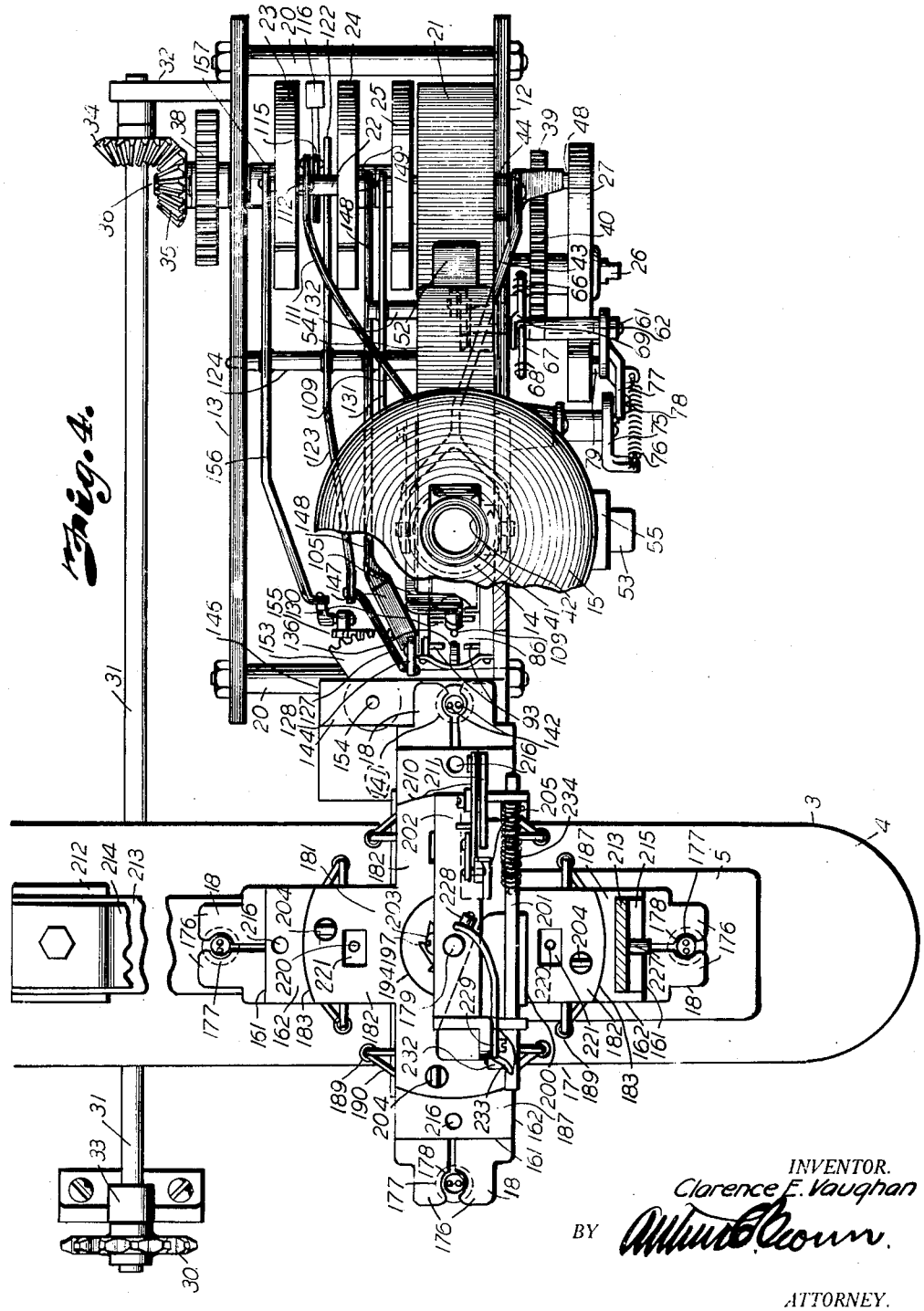
INVENTOR.
Clarence E. Vaughan
BY
ATTORNEY.

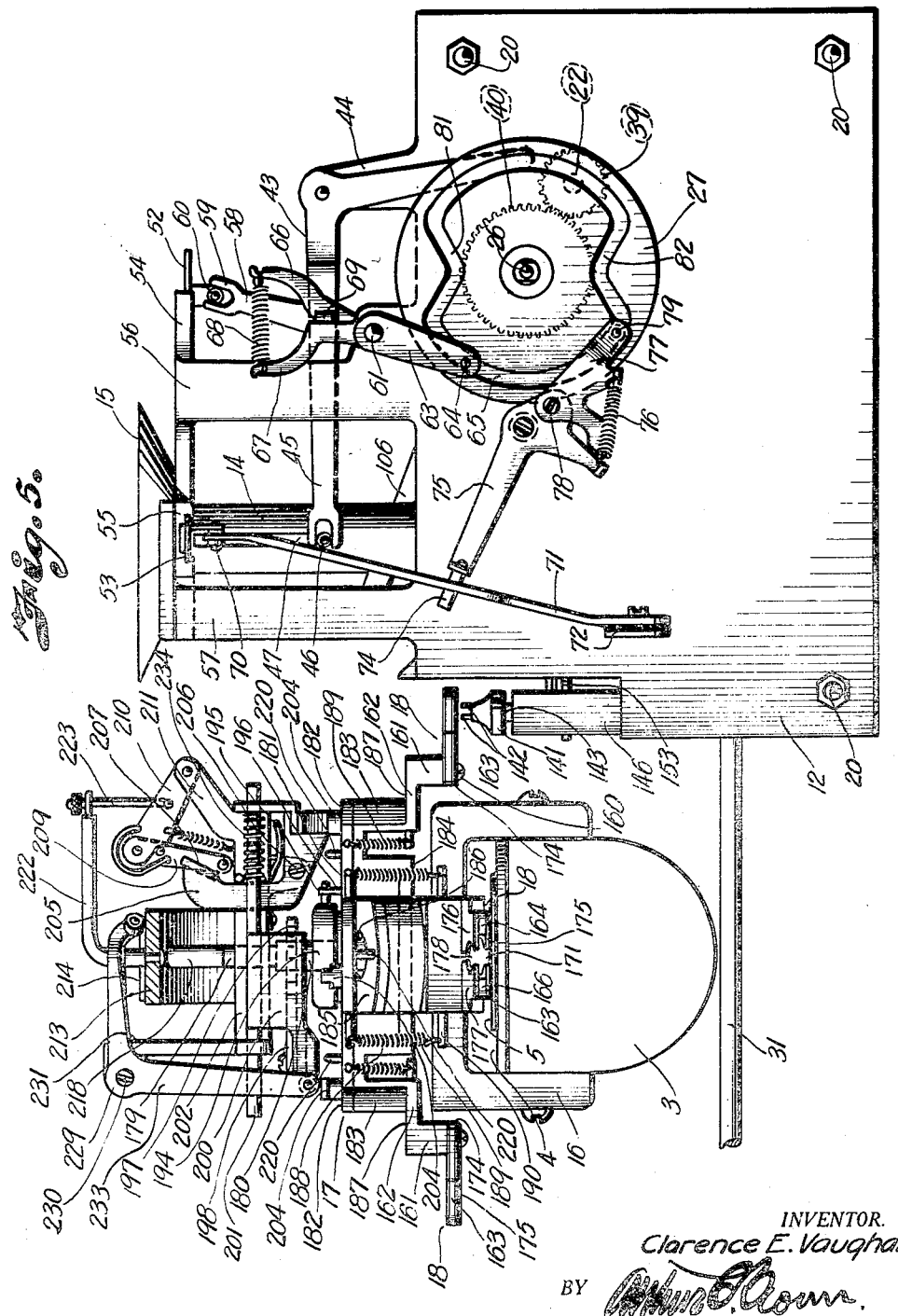

Dec. 26, 1933.  C. E. VAUGHAN  1,941,027
BUTTON FEEDING APPARATUS
Filed July 7, 1930  20 Sheets-Sheet 6
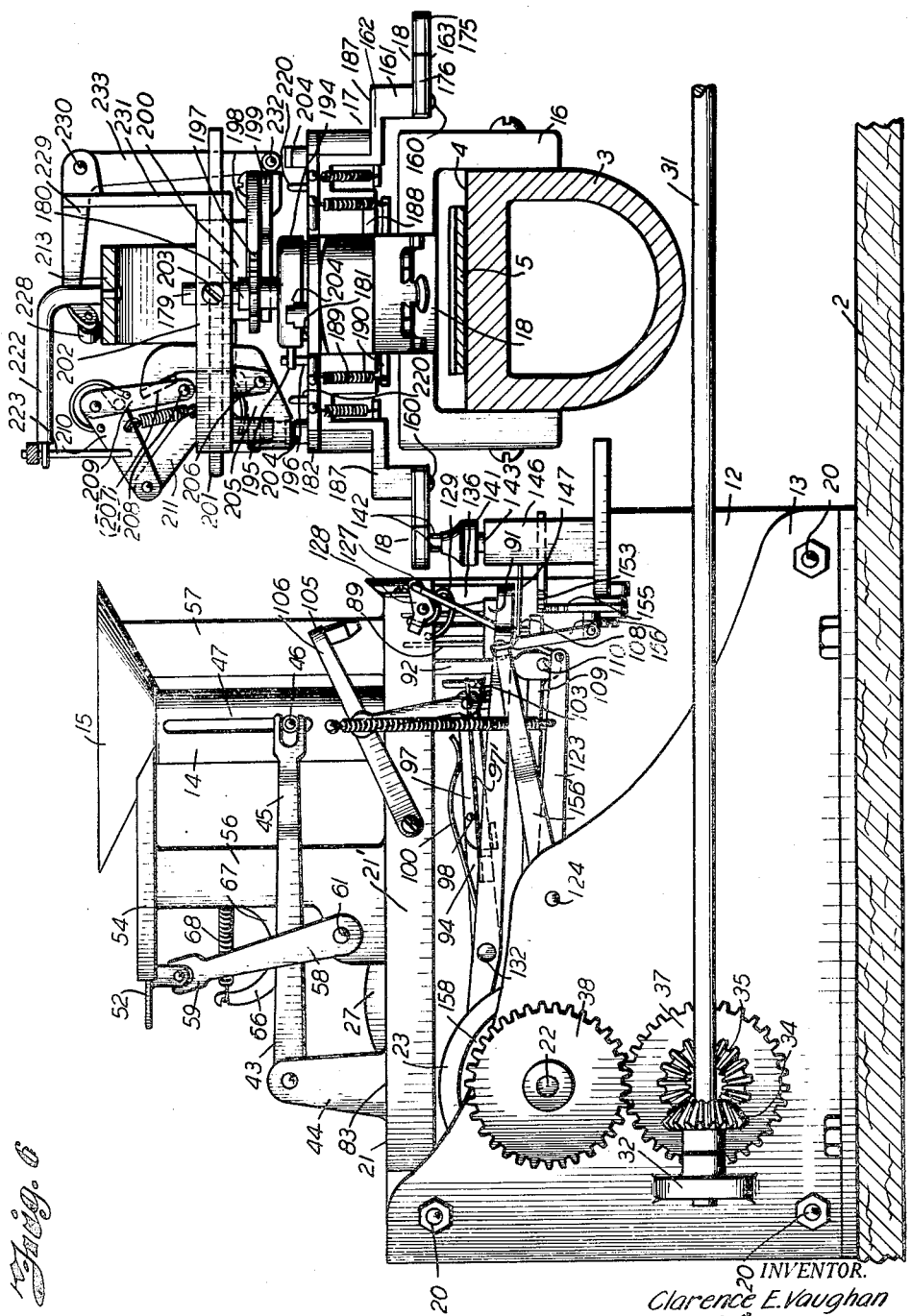
INVENTOR.
Clarence E. Vaughan
BY
ATTORNEY.

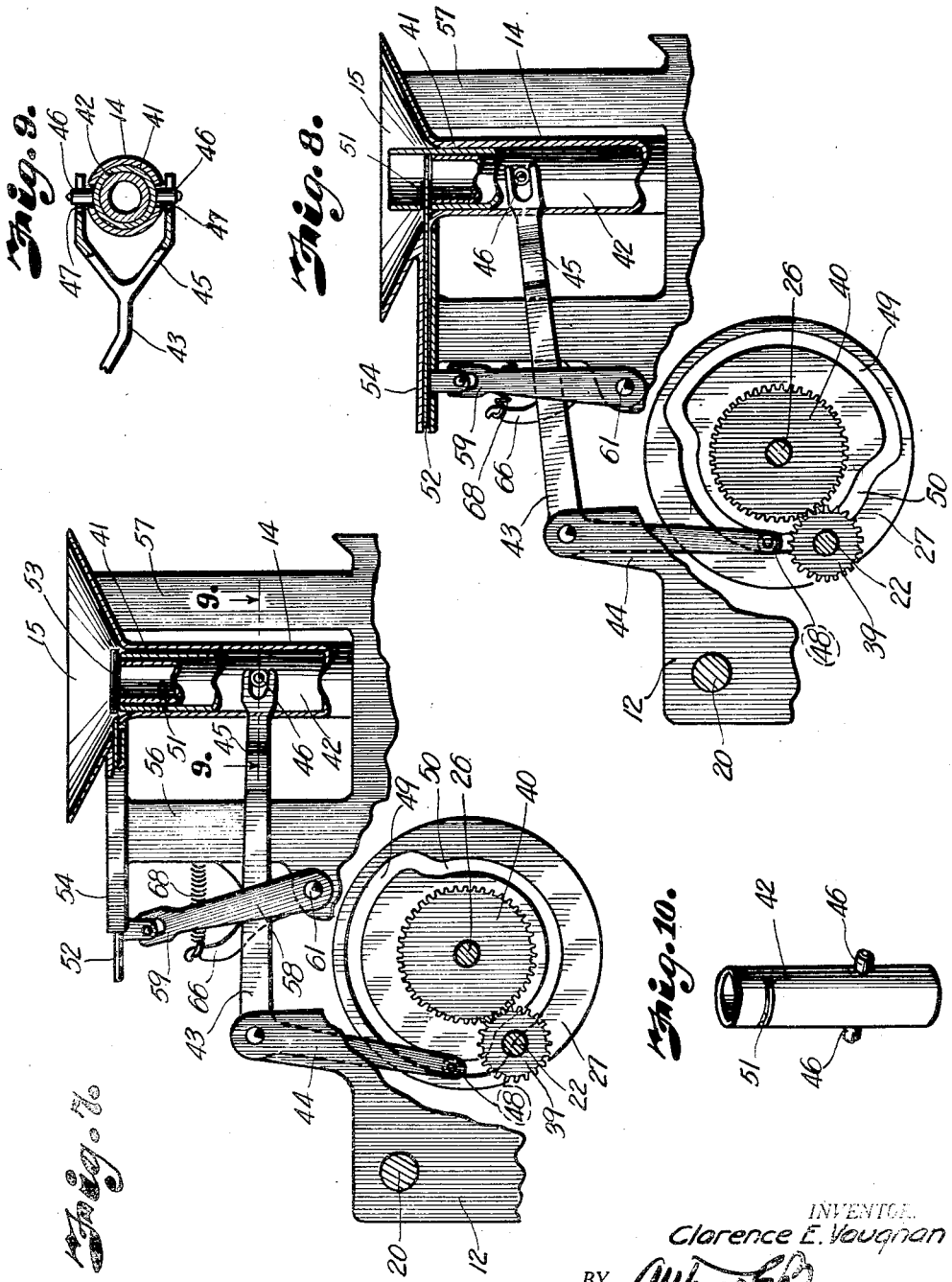

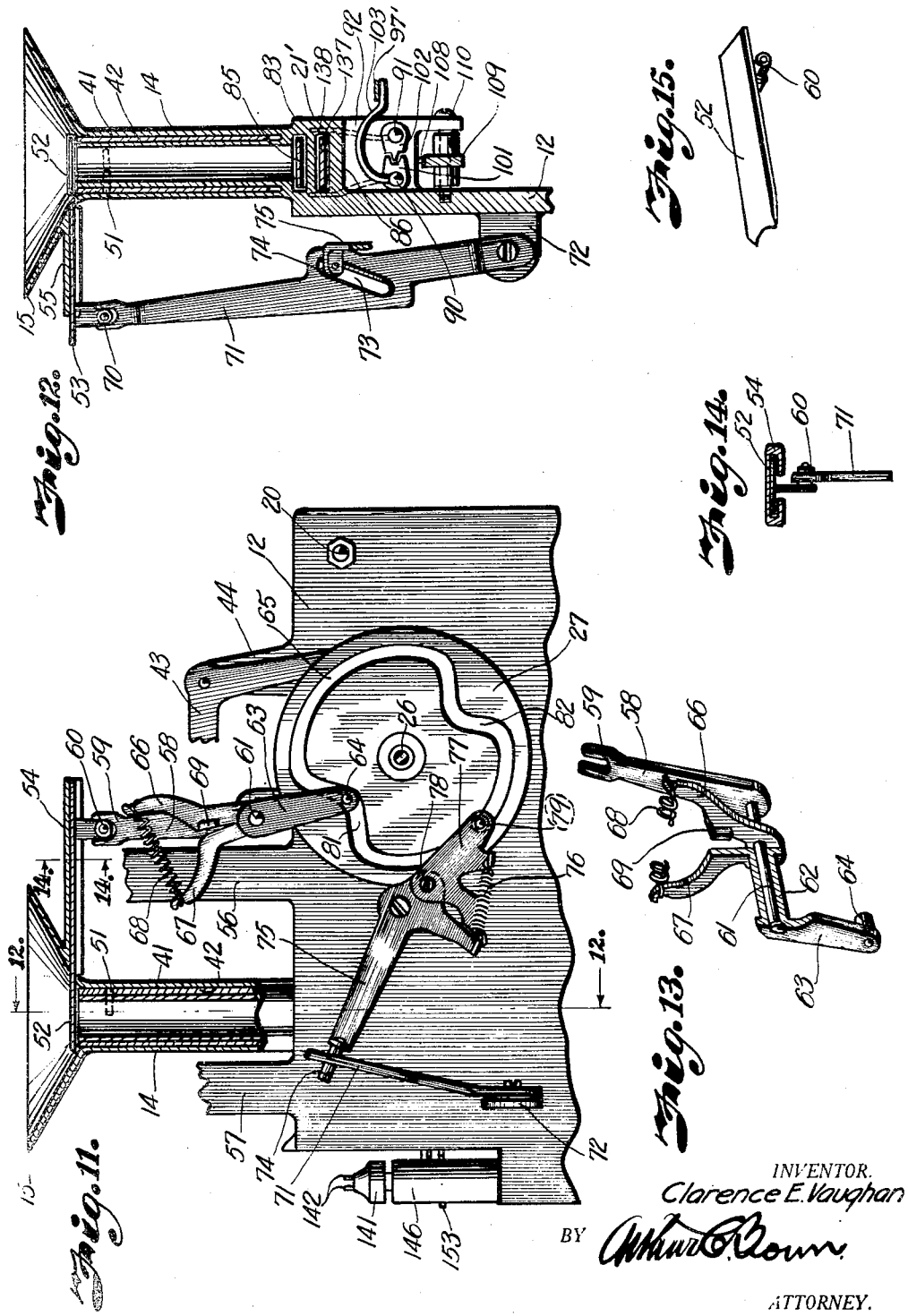

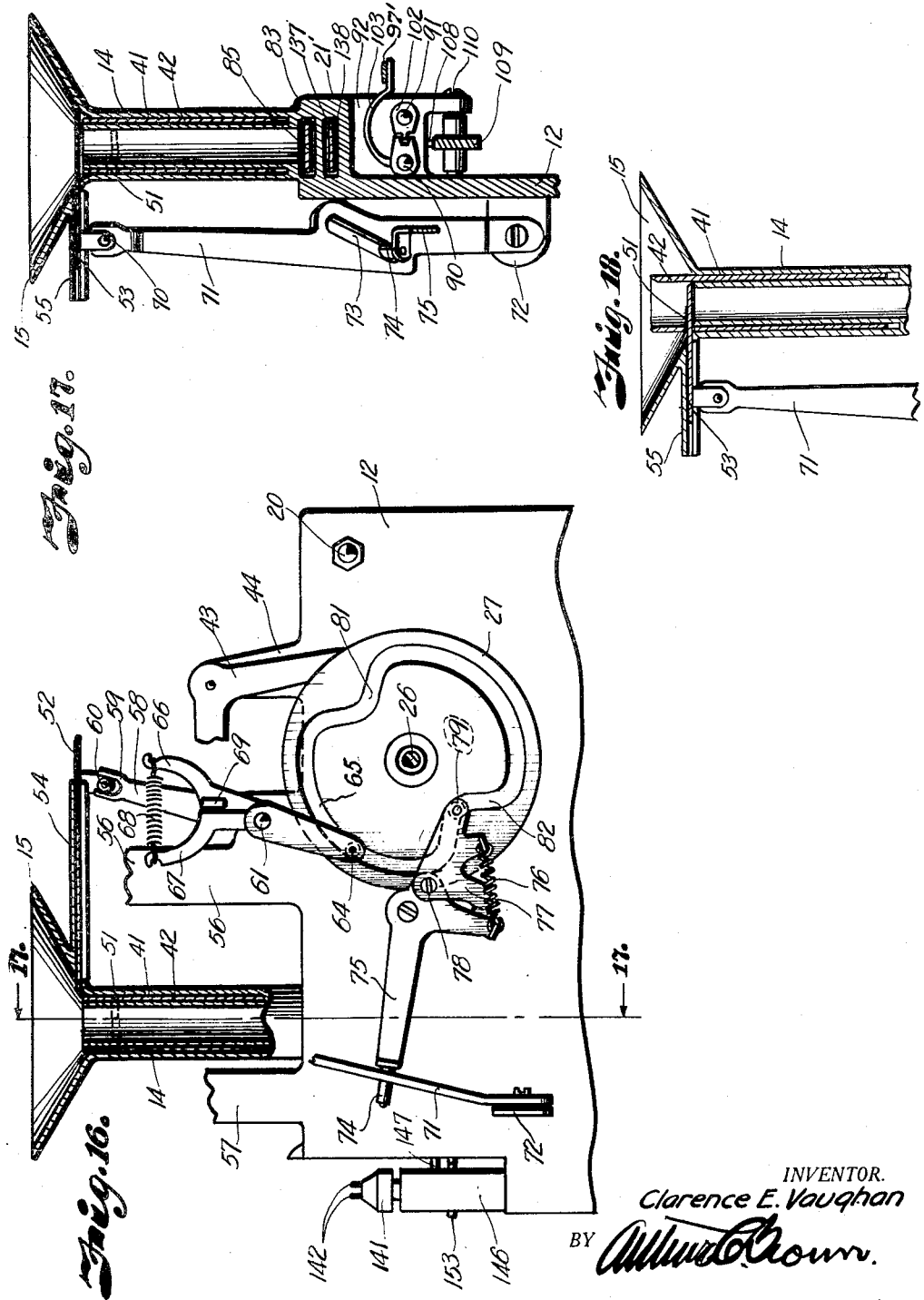

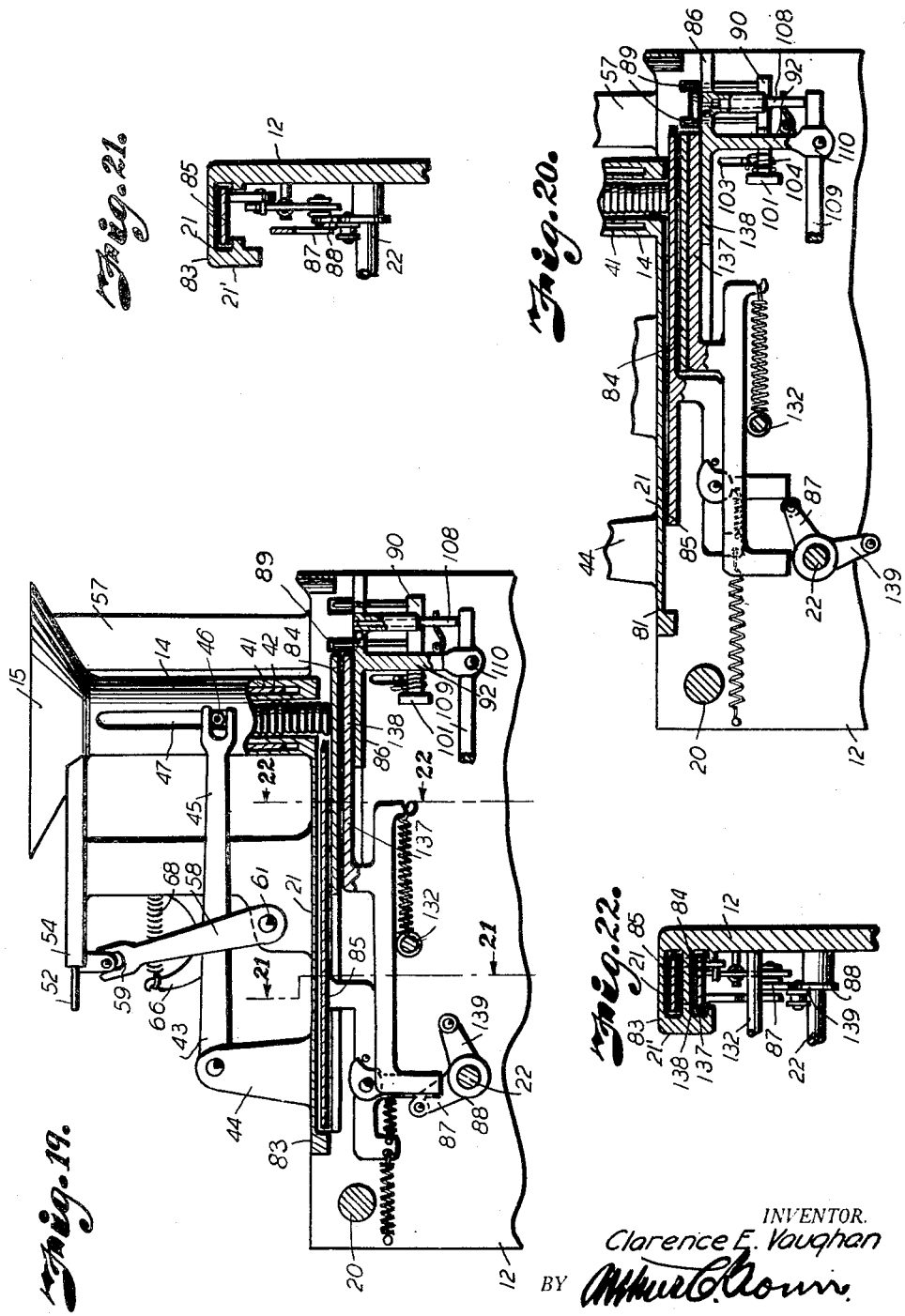

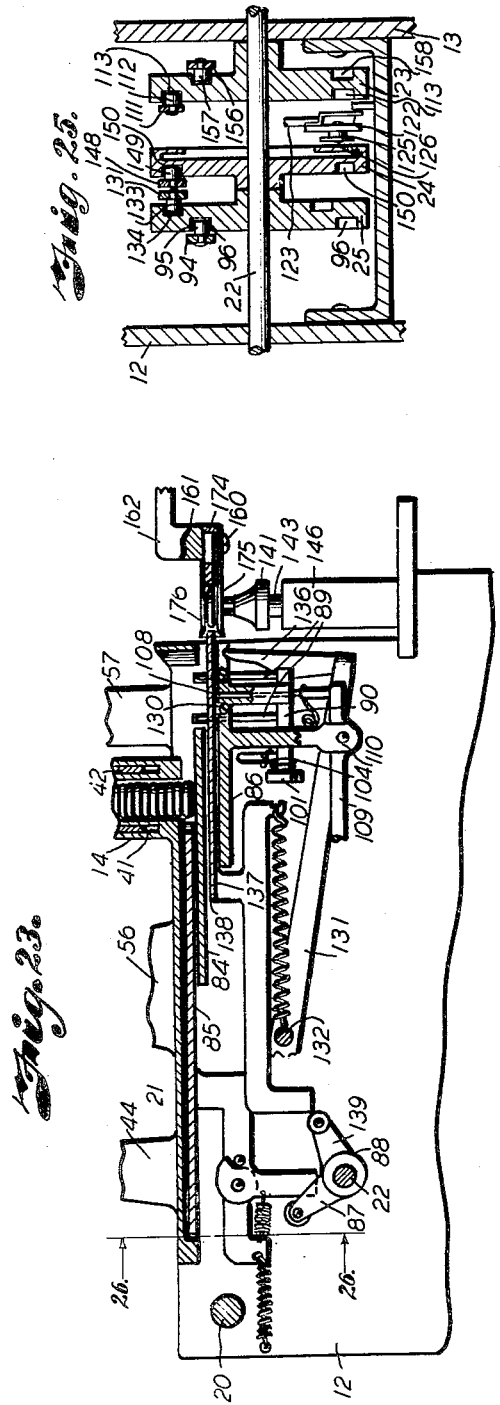
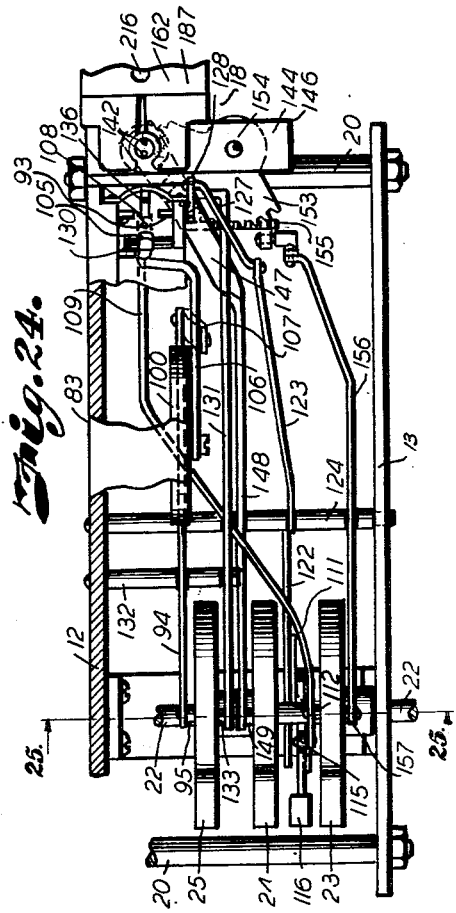
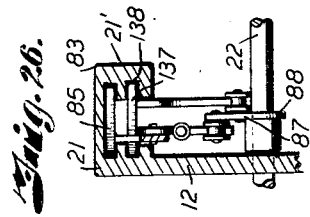

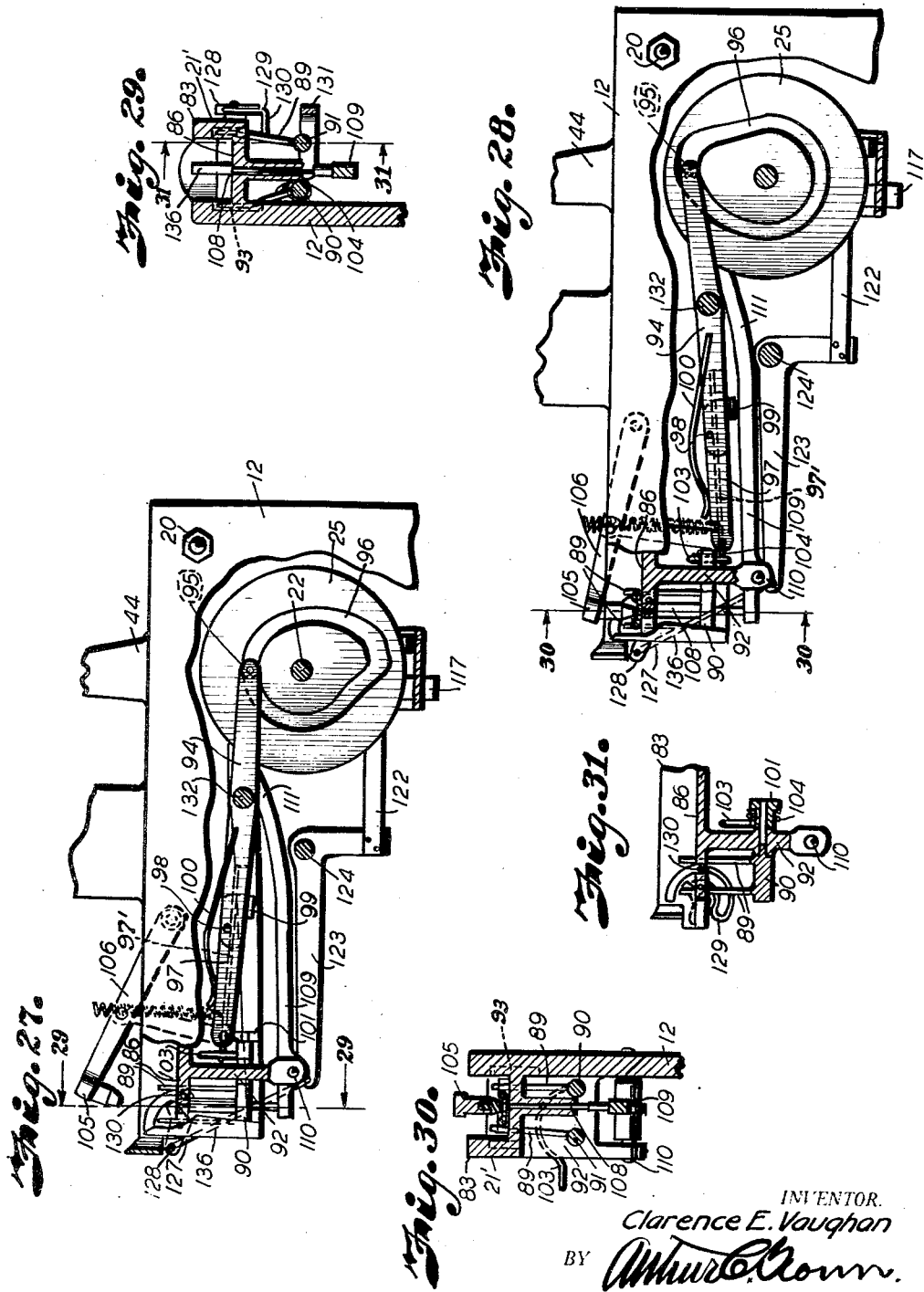

Dec. 26, 1933.   C. E. VAUGHAN   1,941,027
BUTTON FEEDING APPARATUS
Filed July 7, 1930   20 Sheets-Sheet 13
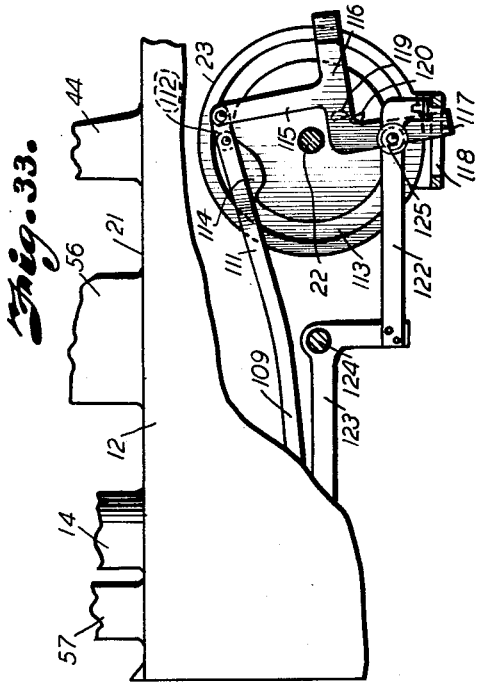
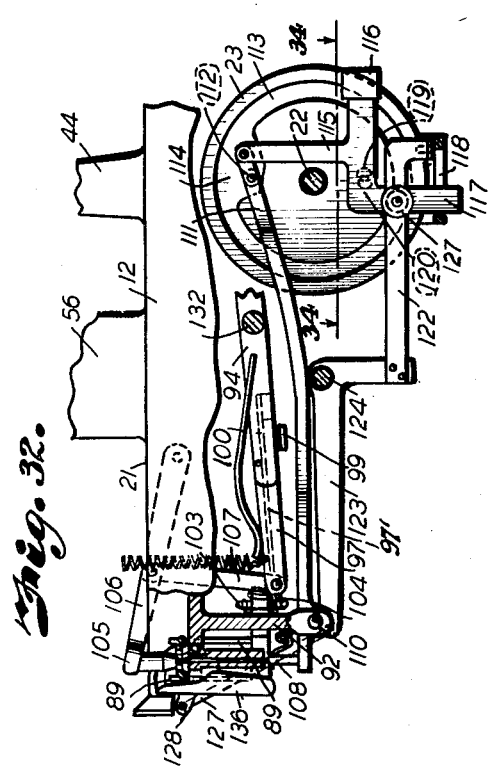
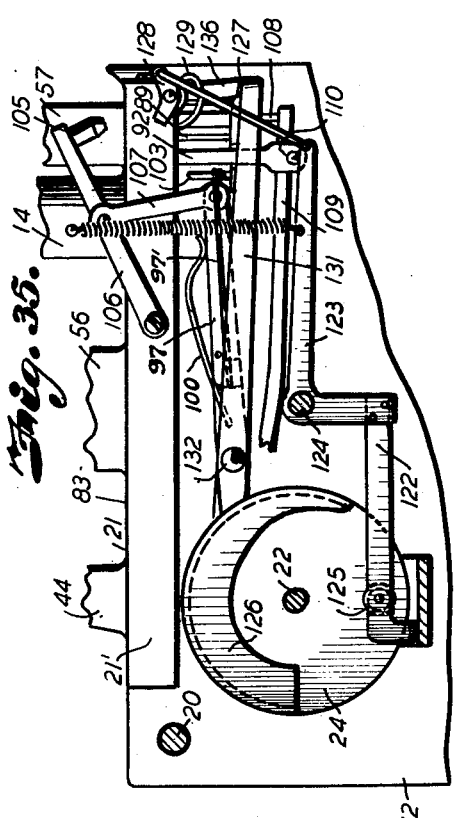
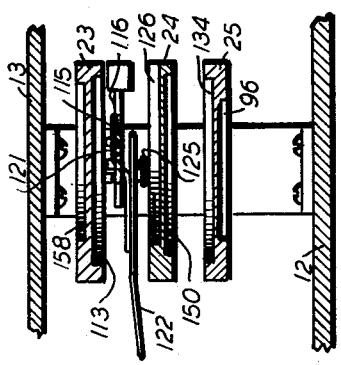
INVENTOR.
Clarence E. Vaughan
BY
ATTORNEY.

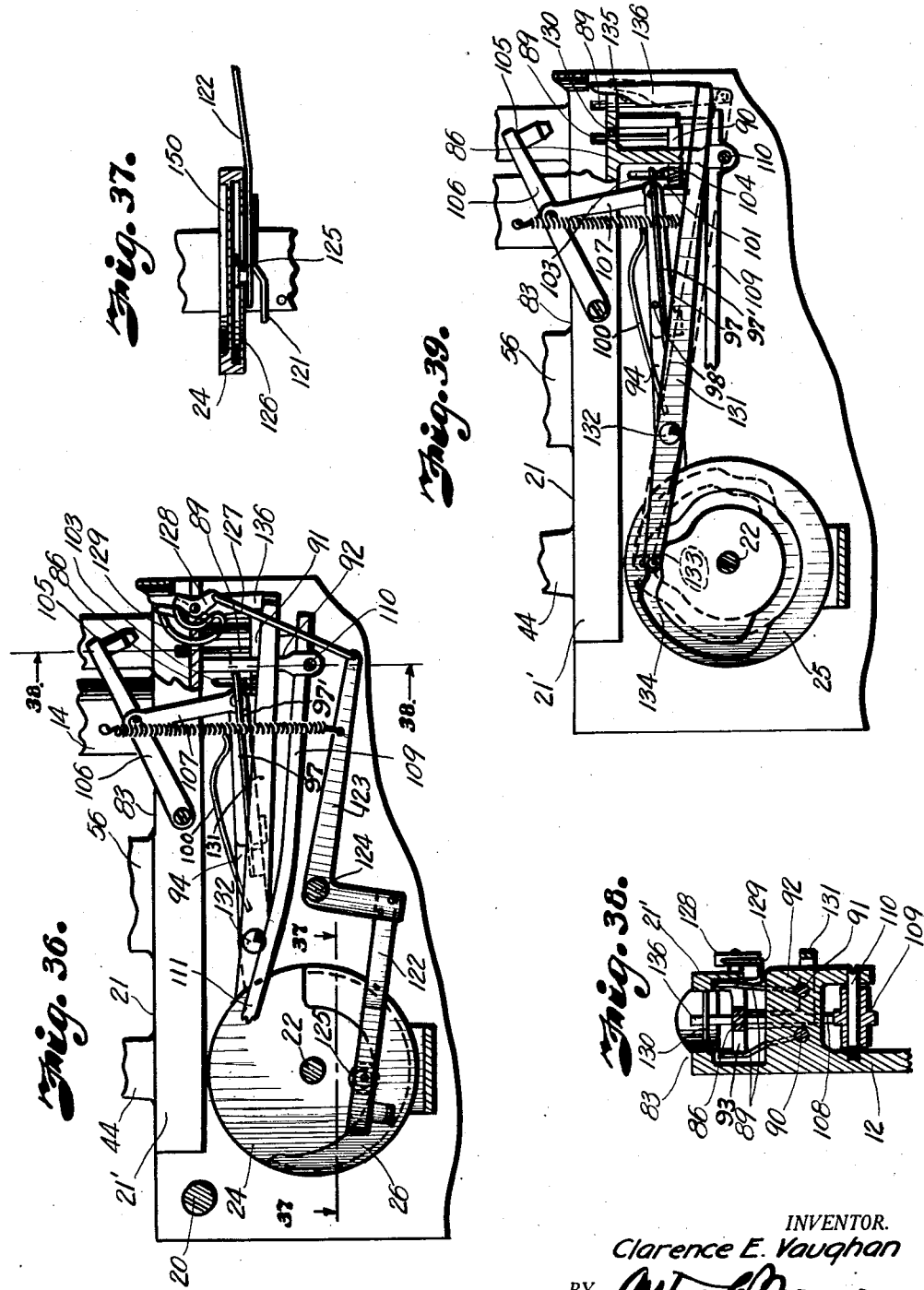

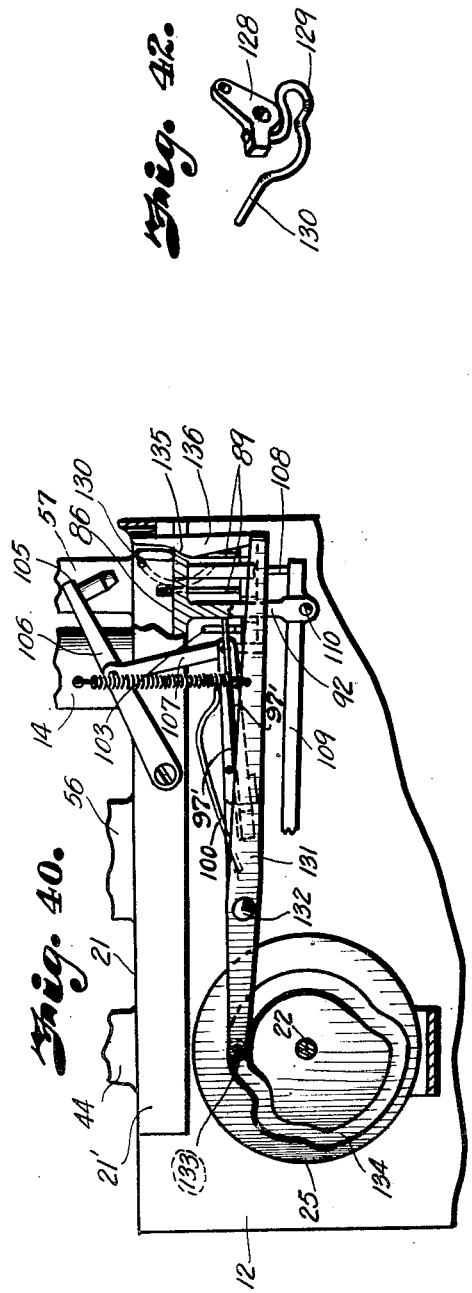
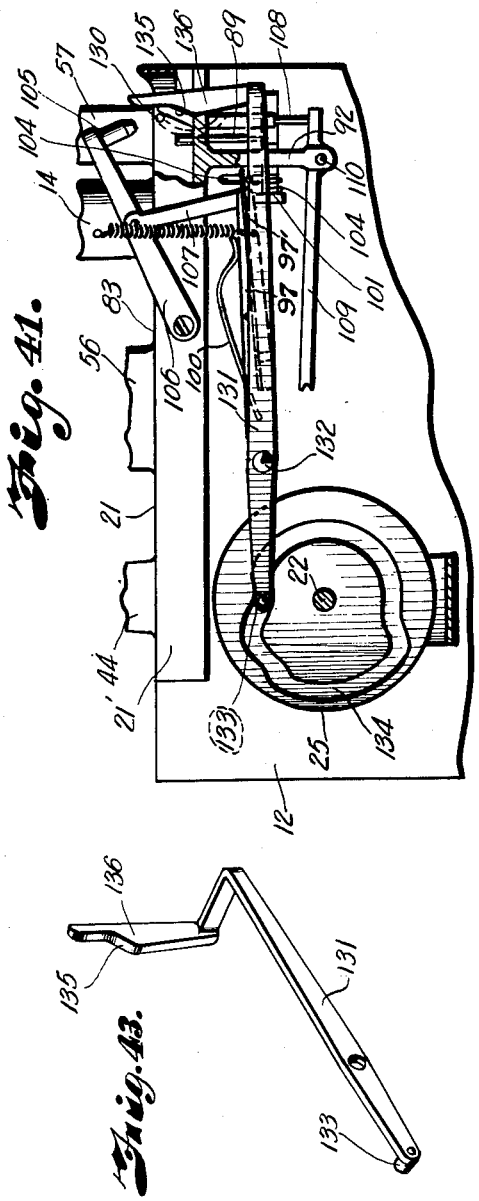

Dec. 26, 1933.    C. E. VAUGHAN    1,941,027
BUTTON FEEDING APPARATUS
Filed July 7, 1930    20 Sheets-Sheet 16
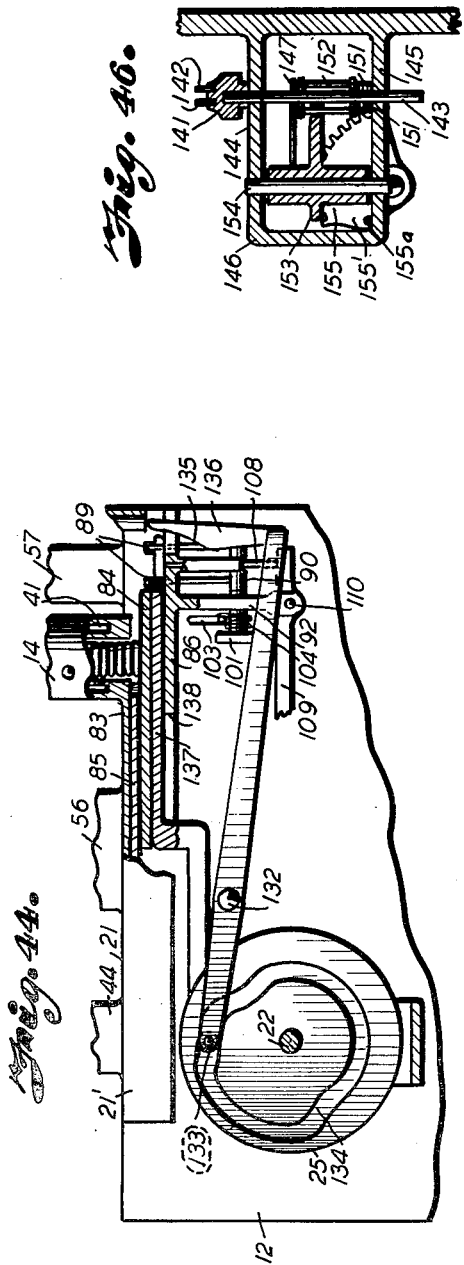
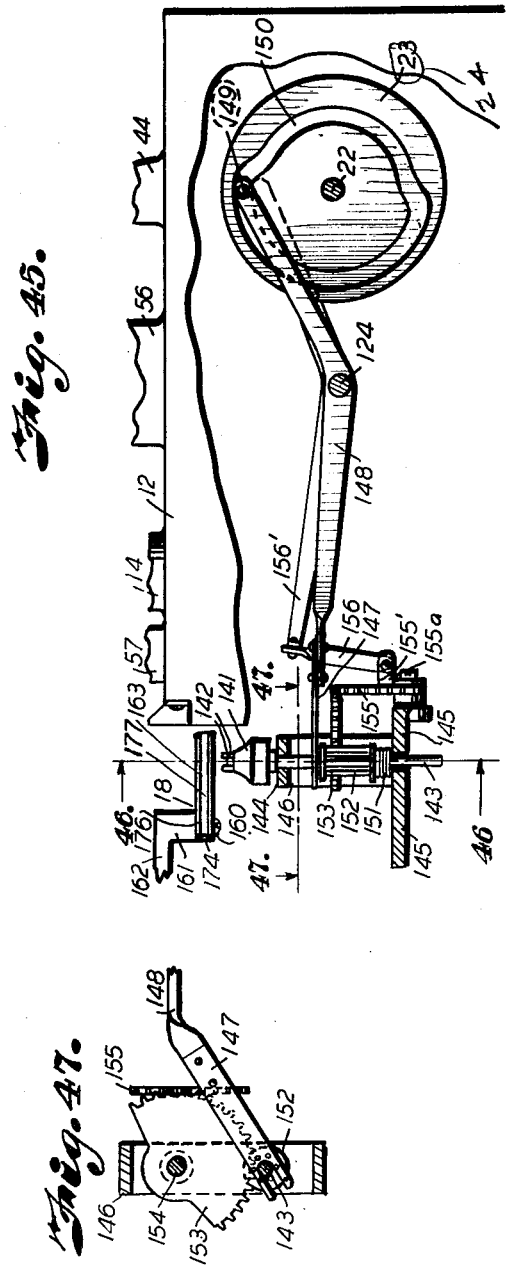
INVENTOR.
Clarence E. Vaughan
BY
ATTORNEY.

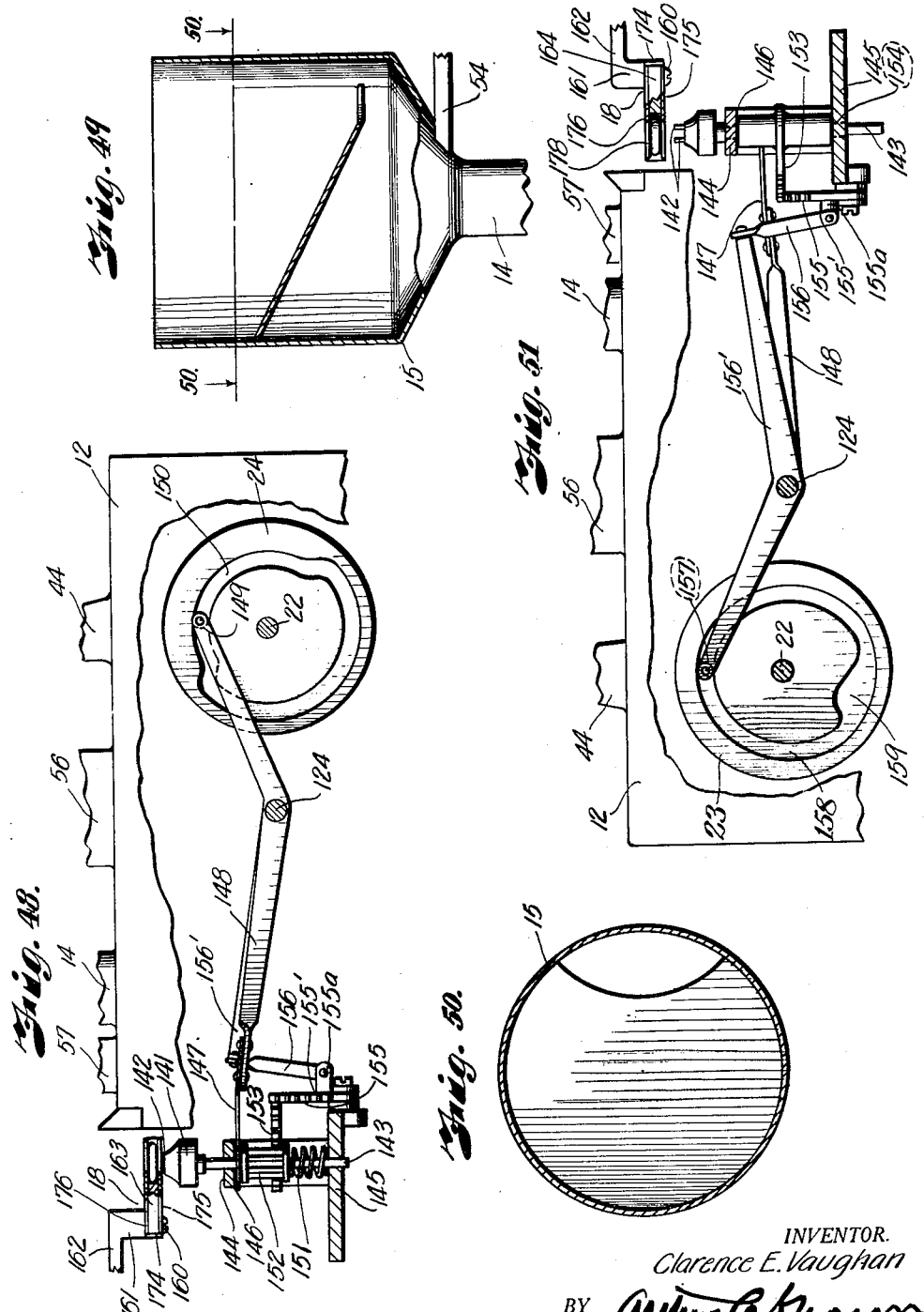

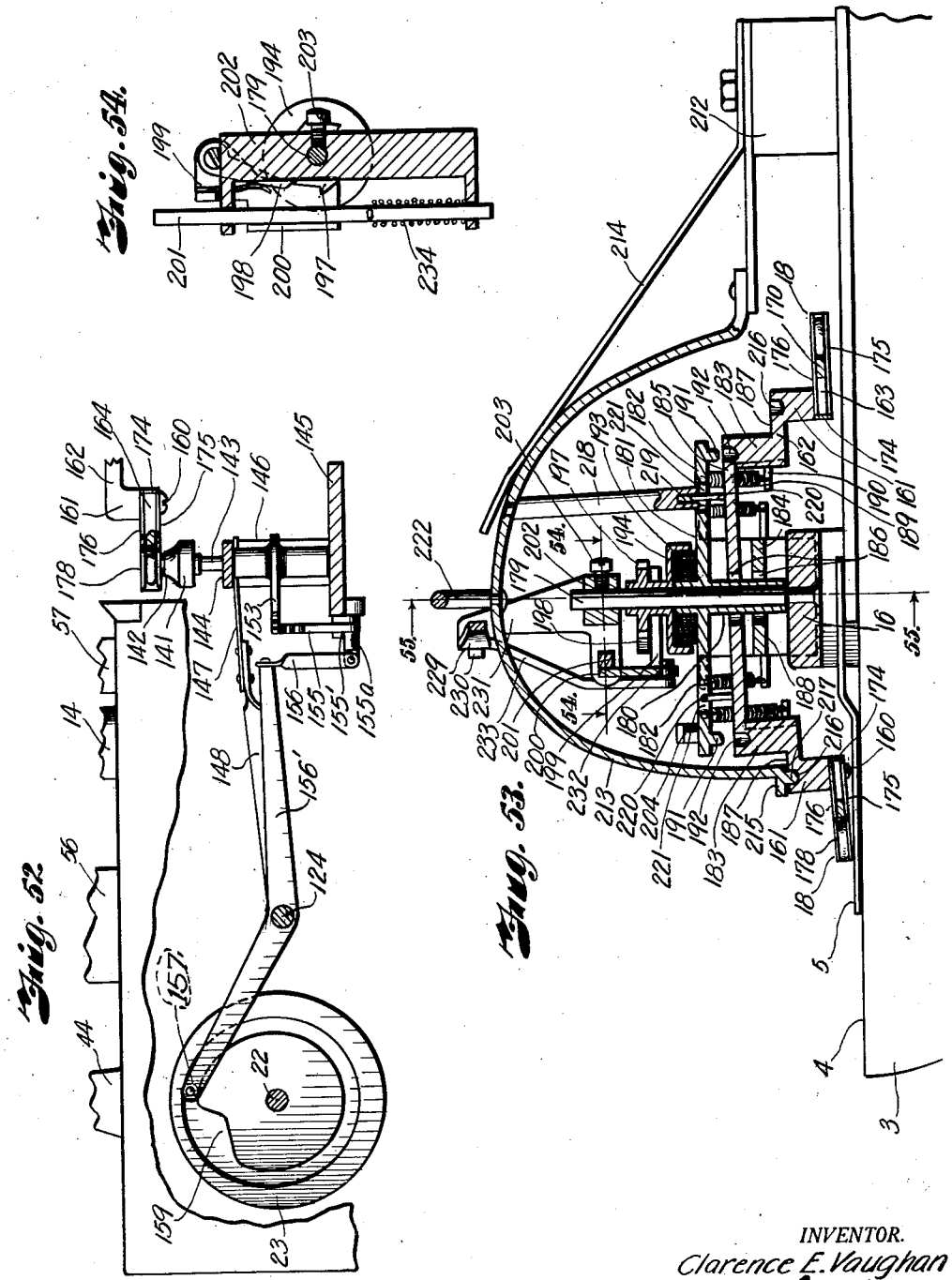

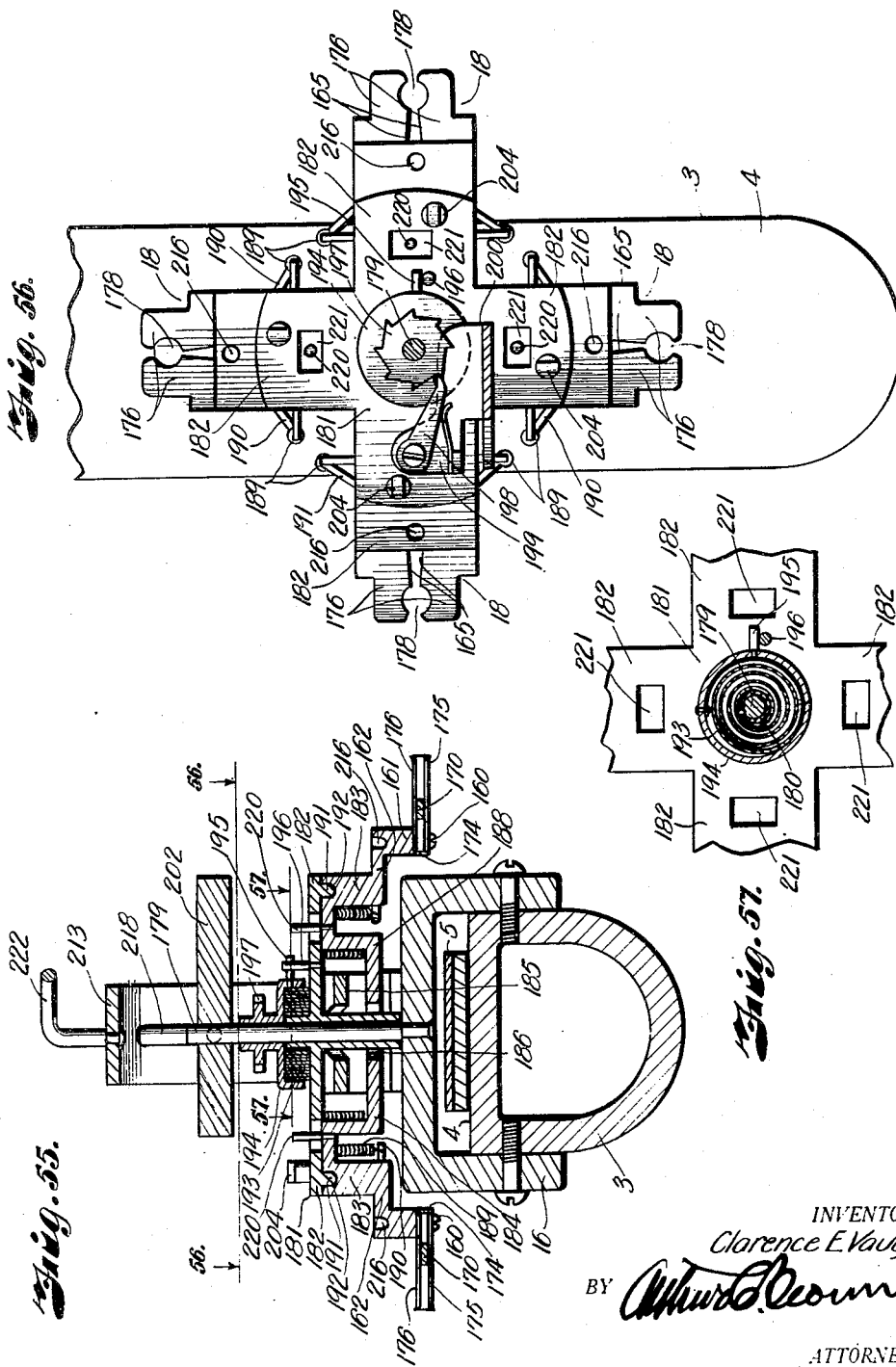

Dec. 26, 1933.  C. E. VAUGHAN  1,941,027
BUTTON FEEDING APPARATUS
Filed July 7, 1930   20 Sheets-Sheet 20
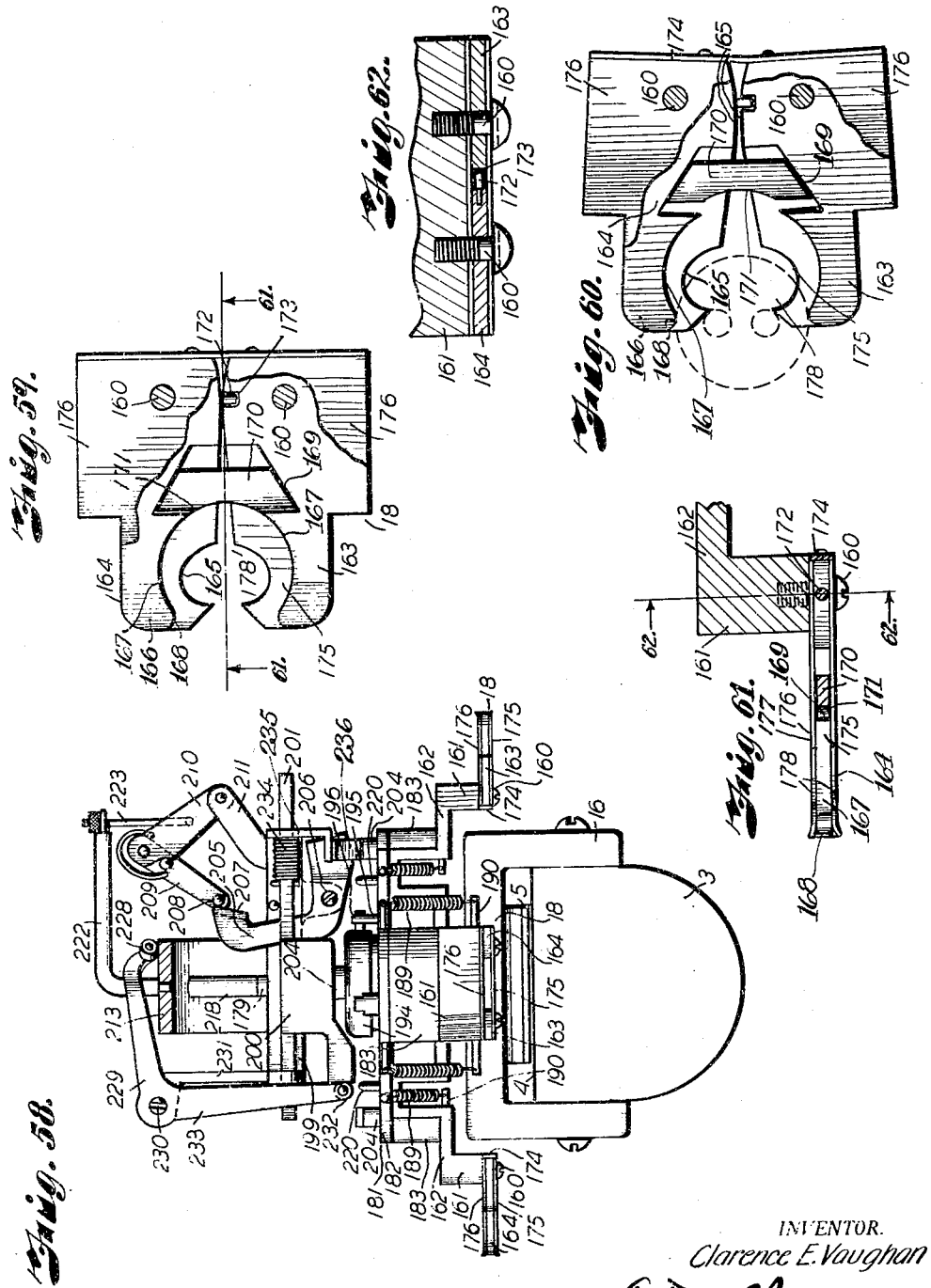
INVENTOR.
Clarence E. Vaughan
BY Arthur C. Brown
ATTORNEY.

Patented Dec. 26, 1933

1,941,027

UNITED STATES PATENT OFFICE 1,941,027

BUTTON FEEDING APPARATUS

Clarence E. Vaughan, Overland Park, Kans., assignor of one-fourth to Frank J. Thomas, Kansas City, Mo.

Application July 7, 1930. Serial No. 465,965

28 Claims. (Cl. 112—113)

My invention relates to machines for sewing on buttons or the like, in the operation of which the buttons must be located and retained right side up in the path of a needle, and under present practice requiring that an operator handle each button to assure correct positioning thereof for receiving the threaded needle whereby the buttons are attached to a garment.

The principal objects of my invention are to deliver buttons automatically into sewing relation with the needle of a button sewing machine, to automatically turn inverted buttons prior to action thereon by the needle of the machine, and to provide means under the control of the operator for effecting location of buttons in sewing relation with a needle, whereby handling of buttons by the operator may be obviated, the button sewing operations may be rendered safer and more efficient, and the operations may be expedited.

In accomplishing these and other objects of my invention, I have provided improved details of structure, the preferred form of which is illustrated in the accompanying drawings, wherein:

Fig. 4 is a plan view of the feeding apparatus, parts being broken away for better illustration.

Fig. 5 is a front elevation view of the feeding apparatus.

Fig. 6 is a side elevation of the back side of the feeding apparatus.

Fig. 7 is a view from the back side of the feeding unit, particularly illustrating the gear mechanism for actuating the button leveling mechanism.

Fig. 8 is a similar view showing one of the button leveling members in advanced position.

Fig. 9 is a transverse section through the button chute on the line 9—9, Fig. 7.

Fig. 10 is a detail perspective view of the button agitator tube.

Fig. 11 is a front elevation of the button feeding unit partly broken away and particularly illustrating the cam for actuating the button leveling members which are shown in advanced position.

Fig. 12 is a section on the line 12—12, Fig. 11, showing the transverse leveling member in normal retracted position.

Fig. 13 is a detail perspective view of the levers through which one of the button leveling members is operated by the cam.

Fig. 14 is a section through the leveling member on the line 14—14, Fig. 11.

Fig. 15 is a detail perspective view of one of the button leveling blades.

Fig. 16 is a front elevation of the feeding apparatus showing the button leveling member in normal retracted position.

Fig. 17 is a section on the line 17—17, Fig. 16, showing the transverse leveling member in advanced position.

Fig. 18 is a similar view showing the button agitator tube in advanced position.

Fig. 19 is a view from the back side of the feeding unit broken away for illustrating the slide bar and plunger for delivering buttons from the chute to the distributor unit.

Fig. 20 is a similar view showing the slide bar in advanced position for delivering a button from the chute to the discharge guide channel of the feeder unit.

Fig. 21 is a fragmentary section on the line 21—21, Fig. 19, showing the bell crank for actuating the slide bar and plunger.

Fig. 22 is a fragmentary section on the line 22—22, Fig. 19, illustrating the guideways slidably supporting the slide bar and plunger.

Fig. 23 is a view similar to Fig. 19 showing the plunger in advanced position for delivering a button into the clamp of the distributor unit.

Fig. 24 is a plan view of the feeder unit partly broken away and particularly illustrating the cams for actuating the button aligning mechanism.

Fig. 25 is a section on the line 25—25, Fig. 24, showing the cam grooves in opposite side faces of the cam members.

Fig. 26 is a fragmentary section on the line 26—26, Fig. 23.

Fig. 27 is a front elevation of the cam for actuating the button centering mechanism and presser foot shown in normal retracted position.

Fig. 28 is a similar view showing the centering mechanism and presser foot in advanced position and in engagement with a button.

Fig. 29 is a section on the line 29—29, Fig. 27, showing the button centering pins in retracted position.

Fig. 30 is a fragmentary section on the line 30—30, Fig. 28, showing the centering pins and presser foot in advanced position for engaging a button.

Fig. 31 is a fragmentary section on the line 31—31, Fig. 29, showing the button turning arm in normal position.

Fig. 32 is a front elevation of the cam mechanism for actuating the button feeler pin, and showing the shifting arm on the cam lever in operative engagement with a pin on the cam wheel.

Fig. 33 is a similar view showing the shifting arm at the point of disengagement from the pin on the cam wheel.

Fig. 34 is a section on the line 34—34, Fig. 32, showing the lever for actuating the button turning arm disengaged from its operating cam.

Fig. 35 is an elevation from the back side of the cam for actuating the button turning arm.

Fig. 36 is a similar view showing the cam in advanced position for actuating the lever and button turning arm for turning the button.

Fig. 37 is a fragmentary section on the line 37—37, Fig. 36, showing the button turning arm lever operably engaged by its operating cam.

Fig. 38 is a section on the line 38—38, Fig. 36 showing the button turning arm in advanced position.

Fig. 39 is a side elevation of the back side of the cam for actuating a button retaining and turning finger shown in normal position.

Fig. 40 is a similar view showing the cam in position for lifting the finger to its intermediate position for cooperation with the turning arm in turning a button.

Fig. 41 is a similar view showing the cam in position for lifting the finger to the limit of its upward movement for completing the button turning operation.

Fig. 42 is a detail perspective view of the button turning arm.

Fig. 43 is a detail perspective view of the button turning finger and its support arm.

Fig. 44 is a view similar to Fig. 41 showing the position of the cam and turning finger when a button is delivered to the discharge guide channel by the slide bar member.

Fig. 45 is a front elevation of a cam controlling raising and lowering of a head for rotating the button to sewing position in the clamp of the distributor unit.

Fig. 46 is a section on the line 46—46, Fig. 45, illustrating the gear mechanism for rotating the button in the clamp.

Fig. 47 is a sectional plan view on the line 47—47, Fig. 45.

Fig. 48 is a view similar to Fig. 45 showing the cam in advanced position for holding the button setting head in engagement with a button in the clamp.

Fig. 49 is a vertical longitudinal section through the button-containing hopper.

Fig. 50 is a transverse section through the hopper on the line 50—50, Fig. 49.

Fig. 51 is an elevation of the back side of the cam for actuating the button setting head.

Fig. 52 is a similar view showing the cam in advanced position for rotating the button setting head.

Fig. 53 is a vertical longitudinal section through the distributor unit showing one of the button holding clamps in position for the sewing operation.

Fig. 54 is a section on the line 54—54, Fig. 53.

Fig. 55 is a transverse vertical section on the line 55—55, Fig. 53.

Fig. 56 is a sectional plan view of the distributor mechanism on the line 56—56, Fig. 55.

Fig. 57 is a section on the line 57—57, Fig. 55, particularly illustrating the coil spring for actuating the turret of the distributor unit.

Fig. 58 is a front elevation of the distributor unit, parts being broken away for better illustration.

Fig. 59 is a plan view of one of the button clamps partly broken away for better illustration.

Fig. 60 is a similar view showing the jaws of the clamp in open position for receiving a button.

Fig. 61 is a section through the clamp on the line 61—61, Fig. 59.

Fig. 62 is a vertical section on the line 62—62, Fig. 61.

Figure 1:
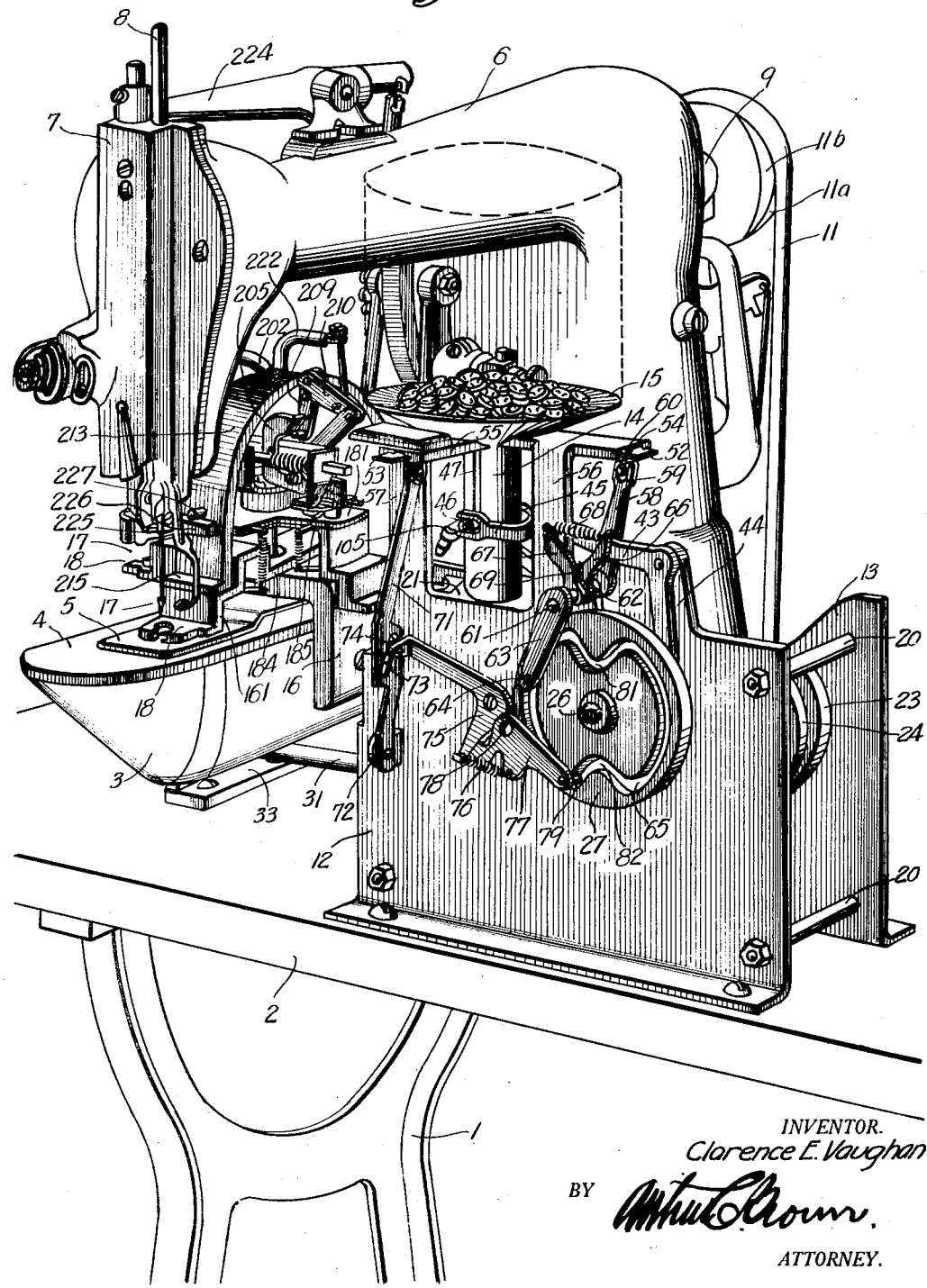
Fig. 1 is a perspective view of the feeding apparatus constructed in accordance with my invention, and shown in operative relation with a sewing machine.
Figure 2:
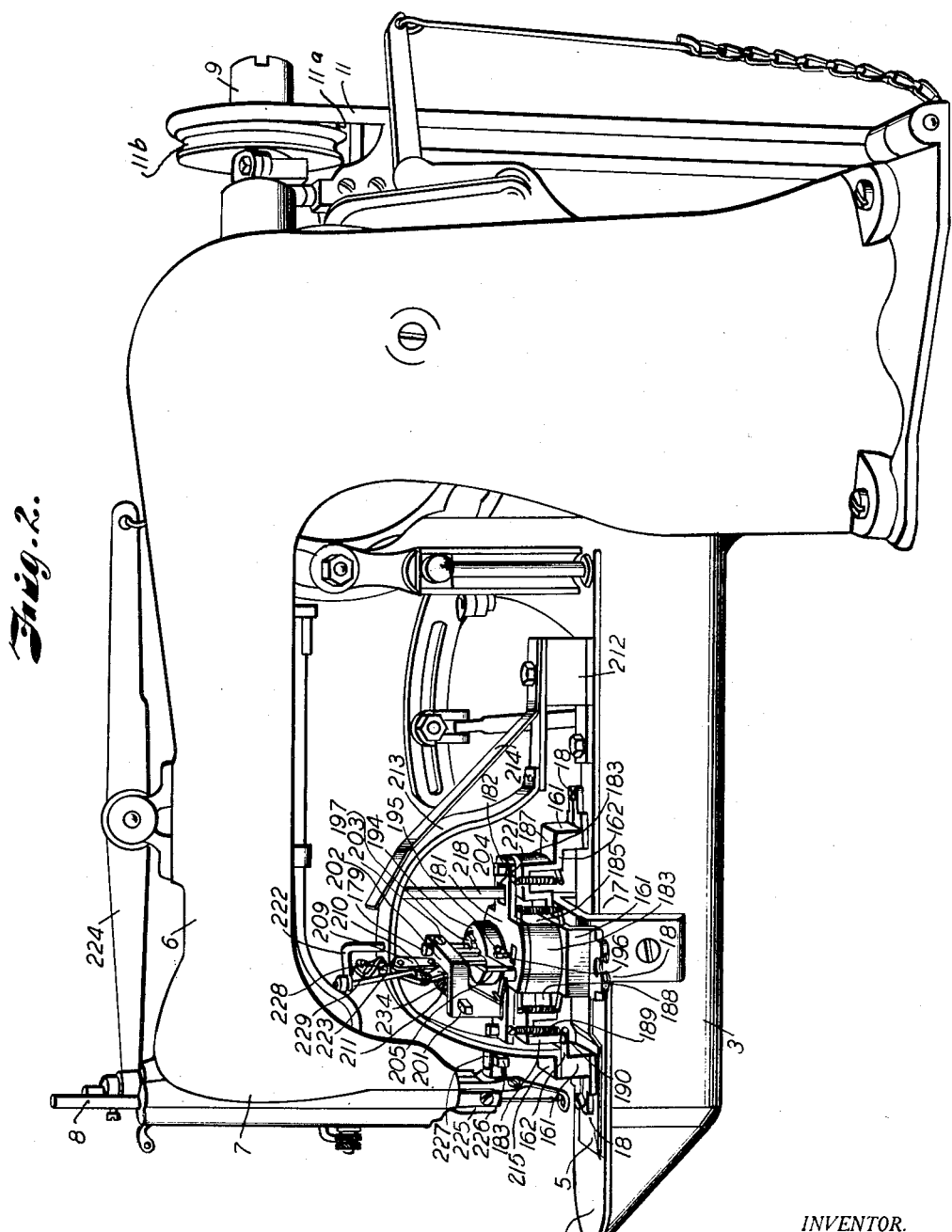
Fig. 2 is a perspective view of a sewing machine showing the distributor unit of the feeding apparatus mounted thereon.
Figure 3:
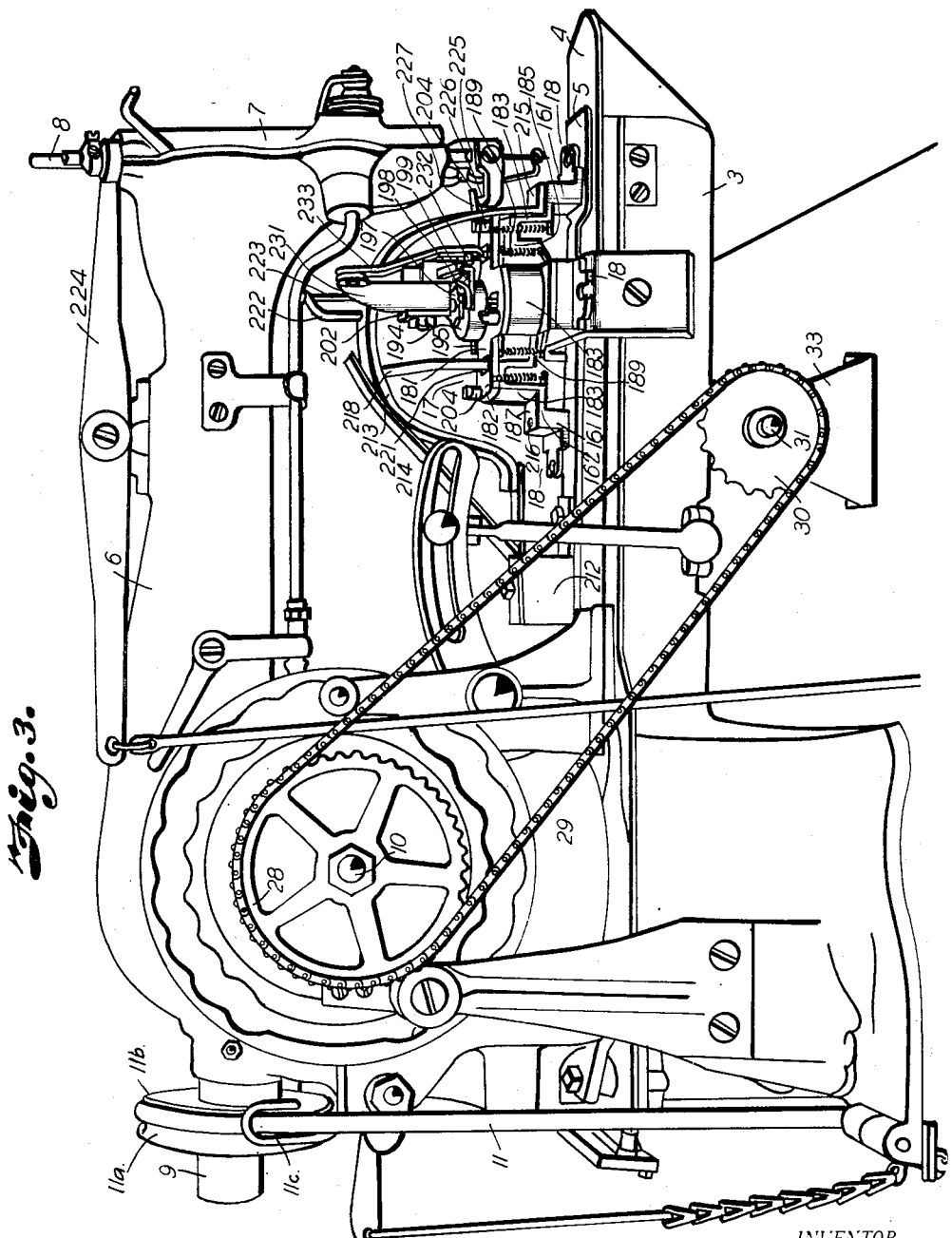
Fig. 3 is a perspective view of the opposite side of the machine showing the transmission means operably connecting the feeding apparatus with the drive shaft of the machine.

Referring in detail to the drawings:

The button feeding apparatus embodying my invention is shown in Figs. 1, 2 and 3 in connection with a button sewing machine including supporting legs 1, a base or table 2, a bed-plate member 3 having a face 4 supporting a work-oscillating strip or shifting bar 5, and an arm 6 having a head 7 in which the needle supporting bar 8 slides, a main shaft 9 and a transverse shaft 10. A belt 11 operated from a motor not shown, runs normally on an idler pulley 11a on the main shaft, and may be shifted to a pulley 11b fixed to said shaft by a treadle-operated yoke 11c, for reciprocating the needle bar and normally operating conventional cooperating elements of a sewing machine.

Mounted on the base 2 at right angles to the axis of the bed plate and spaced therefrom is a feeder unit including parallel vertical front and rear plates 12 and 13 receiving buttons through a chute 14 from a hopper 15. Fixed to the bed plate is a bracket 16 having a mid-portion spanning the face 4 and spaced above the shifting bar for supporting the rotating turret 17 of a distributor unit, including flexibly supported clamps 18 projecting laterally to receive buttons from the feeder, all of which will be particularly described. The apparatus is adapted for locating and holding a button on the bar 5, to permit the needle to pass through the eyes of the button and properly stitch the button to a garment or the like held on the bar under the needle by the operator.

The feeder unit plates 12 and 13 are held in spaced relation by shouldered bolts 20 to form a housing. A plate 21 extending inwardly laterally from the upper edge of the front plate 12 supports the hopper chute and cooperates with a side plate 21' to form guides for buttons and pusher rods as later described.

Journaled in bearings in the plates 12 and 13 is a main feeder unit shaft 22 supporting cam members 23, 24, and 25 located in the housing and a stub shaft 26 projects from the front plate 12 in an offset position from the main shaft to support an exterior cam member 27 (Fig. 4) located outside of the housing and spaced from the front plate 12, for operating levers whereby button turning, button advancing and button leveling mechanisms are operated in synchronism as presently described for positioning buttons in the distributor unit in proper position for registering the eyes thereof with the path of the needle.

The main shaft 22, as shown in Figs. 3, 4, and 6, is driven from the actuating mechanism of the machine through a sprocket 28 on the transverse shaft 10 carrying a chain 29 running on a sprocket 30 on a shaft 31 supported in bearings 32 and 33 on the plate 13 and base 2 respectively, meshed bevel gears 34 and 35 respectively on the shaft 31 and a stub shaft 36, and a gear 37 rotated by the gear 35 and meshed with a gear 38 on the main feeder shaft 22. A pinion 39 on the main shaft (Fig. 4) is meshed with a gear 40 on the stub shaft 26 for rotating the cam member 27.

Slidable in a longitudinal annular groove or circular channel 41 in the wall of the chute 14 is an agitator tube 42 (Figs. 18 and 19) reciprocated therein by a lever 43 pivoted on the outside of a post-like ear 44 on the plate 12 and having a yoke 45 at its outer end provided with spaced ears engaging lugs 46 fixed to the tube and movable in slots 47 in the chute wall. The opposite arm of the lever has a lateral pin 48 operating in a cam groove or track 49 of the cam member 27 (Fig. 4) having a portion 50 adapted to control the lever for shifting the tube vertically.

The upper end of the tube when moved upwardly is adapted to engage buttons in the hopper and when located in the hopper will form a chamber for segregating buttons from the mass in the hopper. The tube has a slot 51 extending substantially 270° about its periphery to admit leveling blades to the buttons therein as presently described.

A pair of blades 52 and 53 slide across the bottom of the hopper at right angles to each other in horizontal guides 54 and 55 extending laterally in opposite directions from the upper ends of extension brackets 56 and 57 (Fig. 1) on the front plate 12.

The blade 52 is operated by a lever 58 having a yoke 59 engaging a roller 60 at the outer end of the blade, and fixed to a shaft 61 rotatable in a sleeve 62 (Fig. 13) carrying a lever 63 having a lateral pin 64 operating in a cam track or groove 65 of the cam member 27. Arcuate arms 66 and 67 respectively fixed on the shaft and on the sleeve have outer ends connected by a spring 68 and a hook or lug 69 on the arm 66 is engaged by the arm 67 for moving the blade in one direction, while the spring affords flexible connection between the arms for moving the blade in one direction.

The outer end of the blade 53 has a depending roller 70 engaged by a yoke on the end of a lever 71 pivoted to a bracket 72 on the plate 12 and provided with an elongated inclined cam slot 73 to receive a roller 74 on the outer laterally bent end of a link 75 pivoted to said plate 12 (Figs. 5 and 12). The link in turn has flexible connection through a spring 76 with a link 77 pivoted at 78 to the link 75 and having a pin 79 moving in the cam track 65 in the outer face of the cam member 27. The cam track 65 includes oppositely recessed or concave cam portions 81 and 82 adapted to effect alternate rocking movement of the levers and reciprocation of the leveling blades upon rotation of the main shaft.

By referring to the cam track illustrated in Figs. 7 and 8, it is apparent that the tube 42 will be reciprocated once during each rotation of the cam disk, and by referring to the cam track 65 for actuating the leveling blades, it will be noted that each blade will be actuated twice during each rotation of the disk 27. Therefore, it is obvious that while the tube is in retracted position the blades 52 and 53 will be alternately reciprocated across the top of the tube, and when the tube is raised the blades will be alternately operated through the slot 51, the length of the slot 51 being sufficient to allow the alternate entrance of the blades.

Vertical reciprocation of the tube and horizontal movement of the leveling blades across the mouth of the hopper among buttons in the hopper or tube will promote feeding of the buttons into the chute to form a vertical tier and leveling of any buttons that may tend to enter the chute in an inclined position.

Slidable in a guide 83 (Figs. 19 to 22) projecting transversely from the front plate 12 and having a bottom plate or floor 84 extending below the guide chute 14, is a plunger or slide bar 85 operating against the edge of a horizontal lower button of the tier to discharge same from the outer end of the guide plate 84 into a longitudinal guide discharge channel or recess adapted to accommodate a single button at a time, including a bottom plate 86 formed at the rear end of the front plate 12, said discharging bar being reciprocable by one arm 87 of a bell crank lever 88 fixed to the main shaft 22.

Sets of centering pins 89 projecting radially from shafts 90 and 91 rotatable in a flange 92 depending from the bottom plate 84 are rocked in slots 93 of the guide bottom 86 and side walls, as shown in Figs. 27 to 30, by a lever 94 having a lateral roller 95 moving in a cam groove 96 in the cam member 25 to coincidently engage opposite edge portions of a button and retain the same momentarily on the median line of the discharge channel, and to move away from the button to permit the same to be advanced.

The shaft 90 is connected to a finger 97 pivoted at 98 to the lever 94, and the finger 97 has a stop lug 99 normally held in engagement with the lever 94 by a spring 100 having one end rigidly fixed to the lever and its other end bearing on the finger to provide a flexible connection between the members for a purpose later described. The shaft 90 has a notched ear 101 engaging an ear 102 on the shaft 91 to rock the same, Fig. 12. An arm 103 on the shaft 90 is engageable by a flat spring 97' fixed to the lever 94 adjacent the pivot 98 and extending forwardly alongside the finger 97 for actuating the centering pins, the spring 97' permitting continued movement of the lever 94 after the pins engage the button, the shaft 90 being fitted with a spring 104 for restoring the pins to normal position.

While the lever 94 is actuating the centering pins, the finger 97 also actuates a presser foot 105 that is moved into engagement with the upper face of the button to hold the same over a feeler pin 108. The presser foot 105 is carried on a lever 106 pivoted to the plate 21' (Fig. 6), and is connected to the free end of the finger 97 by a link 107. When the presser foot has engaged the button, the spring 100 yields to compensate for a slight idle movement of the lever 94 in applying pressure to the button. The feeler pin 108 is carried on the outer end of a lever 109 pivoted at 110 to the guide plate bottom flange 92 below the guide channel (Fig. 27). The pin is projectible into the channel for contact with the downwardly disposed face of the button to control operation of mechanism presently described whereby an inverted button is overturned to locate the button right side up for delivery to button-sewing position in the machine.

Mounted on a forward extension arm 111 of the lever 109 is a roller 112 engaging a cam track 113 on the cam member 23 having a recessed portion 114 (Figs. 32 and 33). When the button is inverted and its recessed face is presented to the feeler pin, the pin is free to rise into the channel and permit pivotal movement of the lever 109, such lever movement being controlled, however, by the roller and cam. When the roller engages the recessed portion 114 of the cam, as shown in Fig. 32, turning mechanism now to be described becomes operable, said mechanism being otherwise inoperable.

Pivotally suspended from the end of the lever portion 111 is an arm 115 having a weighted branch 116 and an offset lower end portion 117 operating in a slotted guide 118 and provided with a pin 119 projecting toward the cam member 23. When the lever 109 is free and swings downwardly on its pivot the arm 115 is lowered to locate the pin 119 in the path of a pin 120 projecting laterally from said member 23 as shown in Fig. 32.

Anti-clockwise rotation of the cam member 23 will cause the arm 115 to swing outwardly to the right in Fig. 32 and the portion 117 will then engage a slide cam 121 on a laterally flexible finger 122 on a lever 123 pivoted substantially centrally on a pivot rod 124 supported by the front plate 12 to cause a roller 125 on the finger to be shifted into engaging relation with a cam 126 on the cam member 24 for pivoting the lever.

As the cam 23 rotates with the main shaft, the pivoting lever 123 actuates means bearing against a button to tilt the same, preferably including a link member 127 connected to one arm of a bell crank lever 128 pivoted at the back end of the guide, and causes a turning arm 129 comprising a body such as a rod or wire moving in an arcuate recess or groove in the side wall of the channel and having a laterally bent end 130 projecting into the channel to move upwardly against the rear portion of the centered button and tilt or lift the same on one edge to a substantially vertical position in the guide channel as shown in Fig. 40.

At this point of operation, a lever 131, Figs. 40 to 43, pivoted on a rod 132 projecting from the front plate 12 and having a lateral roller 133 running in a cam groove 134 in the cam member 24 is pivoted to move the cam face 135 of a vertical turning finger or plate 136 carried on the lever upwardly against the button to retain the lower edge portion thereof and shift said portion toward the turning arm 129 to complete the turning of the button.

The upper edge portion of the button is thus moved forwardly by the lateral wire 130 and falls against the upper end of the vertical finger 136 whereupon the upper edge portion is tilted forwardly while the lower edge portion is restrained, and the button will then slide on the finger and bottom of the channel and rest in the channel right side up.

It is to be understood that the turning mechanism above described operates only when an inverted button permits the feeler pin to move, for example, when a recessed top face of a button is presented to the pin.

A plunger 137 reciprocable in a guideway 138 below the slide bar and operable by a second arm 139 on the bell crank lever 88, Fig. 19, then operates to shift the button outwardly from the guide channel to the right in Fig. 19, into one of a series of said clamps 18 of the distributor unit.

Attention is called to the fact that both of the plungers are retracted by snap action of springs, and are spaced by the guide plate 84. The guides including plates 84 and 86 may form a single member comprising a block having bores forming the guide channels.

Since it is apparent that a button may be delivered to a clamp in such a position that the eyes are not arranged to receive the needle of the machine, button-arranging means is provided preferably comprising a device for turning the button on its axis in a clamp and consisting of a setting head 141 (Figs. 45 to 51), having a pair of pins 142 and mounted on a shaft 143 slidable in upper and lower walls 144 and 145 of a housing 146, Fig. 46, projecting laterally and longitudinally from the front plate 12 into the space between the feeder unit and the bed plate and below the path of the revolving clamps.

The head is normally held down away from a clamp by a spring lever 147 comprising a finger projecting longitudinally from a lever 148 pivoted on the rod 124, and having a roller 149 operating in a cam groove 150 on cam member 24, Figs. 24 and 45.

The setting head is urged upwardly by a coil spring 151 sleeved on the shaft 143 and seated on the lower wall 145 of the housing and the upwardly projecting pins 142 are arranged to engage in the eyes of a clamp-supported button when the spring is permitted by the cam-controlled lever to elevate the head, and the head is rotated as presently described.

Fixed to the shaft is a pinion 152 meshed with a horizontal gear segment 153 supported by a vertical pivot bar 154 mounted in the housing, and a vertically arranged gear segment 155 pivoted to the lower housing wall is meshed with the segment 153.

Pivotally connected to the segment 155 at 155' is a pin 155a connected by a link 156 to a lever 156' pivotal on the rod 124 and having a roller 157 operating in an electric track or cam groove 158 in the cam member 23 between said member and the rear plate 13.

As the cam member 23 rotates, the lever will be tilted upon engagement of the roller with the portion of the cam track wall nearest the axis of the cam member and swing the segment 155 to rotate the head.

The head is rotated alternately in opposite directions through 180 degrees of a circle by the effect of the eccentric groove track on the lever, and is adapted to start rotating in one direction immediately after the finger 147 releases the head, so that the pins will engage and move over the lower face of the button and tend to enter the eyes to turn the button.

When the head has rotated 180 degrees, and has turned the button to predetermined position in the clamp, the lever 148 and finger 147 again come into action to retract the head, and the lever roller 157 starts on the portion of the cam track which will effect reverse rotation of the head.

Attention is called to the operation of the cam track 158, whereby the inner eccentric wall of the track controls the roller and lever 156', and therefore retains the pins in engagement with the edges of the button eyes to move the button rotatively.

When the head has finished a button-rotating movement, the pins still engage the eye edges, and in order to disengage the pins and permit the head to move freely away from the button, a recess 159 is formed in the inner wall of the cam track Figs. 51 and 52, into which the roller 157 recedes, the normal portion of the wall then engaging the roller as the head is pressed downwardly by the finger 147.

Each clamp, Figs. 59 to 62, comprises a pair of jaw members mounted on pivot bolts 160 threaded in the lower end faces of legs 161 depending from revolving radial arms 162 resiliently supported from the turret as later described, said members including blocks 163 and 164 having abutting arcuate rear inner edge portions 165, jaws 166 having arcuate inner edges 167 to engage a button and tapering outer end edges 168 to facilitate entrance of a button into the jaws, and registering edge notches having forwardly diverging walls 169 to receive and retain a wedge 170 having an arcuate front edge recess 171 to receive a portion of the periphery of a button.

A pin 172 projecting from one block into a socket 173 in the other block substantially in alignment with the pivots 160 further retains the members in operable relation. A flat spring 174 fixed to the aligned rear edges of the members forms a hinge yielding to permit a button to enter or leave the jaws and reacting to return the jaws to closed position.

Lower and upper plates 175 and 176 on each jaw block have flange-like inner edge portions 177, Figs. 5 and 61, projecting across the recesses in the edges of the blocks to form walls for respectively supporting and retaining a button and the wedge, and are provided with edge recesses 178 to admit the button-rotating pins to the button eyes and permit the needle to pass through the eyes of a clamp-retained button.

The plunger therefore may project a button against the beveled corners of the blocks to spread the same for admitting the button to the jaws, and the jaws will be brought together by the hinge spring to hold the button in the pocket formed by the jaws.

The turret assembly further includes a vertical support post 179, Fig. 55, fixed to the middle cross portion of the bracket 16, a sleeve 180 rotatable on the post and supported by the bracket, and an upper plate 181 fixed to the sleeve adjacent the upper end thereof having pairs of arms 182 extending oppositely radially from the sleeve.

The radial clamp-supporting arms project laterally from the lower ends of vertical fingers 183 on a pair of bars 184 and 185, Figs. 53 and 55, having relatively large central openings 186 for freely rotatably mounting the bars over the sleeve between the turret plate and the bracket 16, whereby the arms form seats 187 for a purpose presently disclosed, the lower bar 184 having offset portions 188 to permit mounting the upper bar between the lower bar and the plate, and permit portions of both bars to engage the plate.

The clamp supporting bars are flexibly and yieldingly supported from the turret plate by springs 189 anchored to the arms 182 and having lower ends secured to pins 190 projecting from the radial clamp-supporting arms 162. Depending lugs 191 on the turret are adapted to engage in sockets 192 in the bars 184 and 185 to assure registry of the arms and bars.

Means for operating the turret for locating and holding the clamps in registering relation with the needle of the machine include a flat coil spring 193 mounted on an upwardly extending portion of the sleeve 180 and having an inner end fixed to said sleeve portion and an outer end fixed to a housing 194 having a lateral pin 195 engageable with a vertical stop pin 196 on the turret plate, Figs. 2 and 55. The housing 194 is integral with a ratchet 197 operated by a pawl 198 pivoted on the arm 199 of a bracket 200, Figs. 2 and 58, fixed to a bar 201 slidable in a supporting bracket 202 keyed to the post 179 by a set screw 203.

Means for latching and retaining the spring-actuated turret in button-locating position, and rewinding the spring, includes a set of upstanding bosses 204 on the turret plate arms engageable by the horizontal end face of a crank 205 pivoted at 206 to the support 202. The crank has an inclined opposite end face 207 in the path of a pin 208 on a finger 209 pivotally suspended from the outer end of a link 210 pivoted on an arm 211 projecting from the support as shown in Fig. 5, and operated as presently described to tilt the crank out of boss-engaging position after a button sewing operation is completed.

Extending over the turret from a supporting block 212 mounted on the strip 5 is a spring bow 213 operated as presently described and normally pressed by a spring 214 to urge an end ear 215 on the bow against the seat 187 of one of the clamp-supporting arms 162 to press the clamp on the work supporting strip 5. Sockets 216 are further formed in the seats 187 to receive a lug 217 depending from the bow ear to latch the ear to the arm 162 which may be locating a button in needle-receiving position.

A rod 218 depending from the bow is provided with an end socket 219 engageable over pins 220 fixed to the bars 184 and 185 and projecting upwardly through relatively large slots 221 in the turret arms, when the bow is depressed for assuring alignment of the bars with the median line of the bed plate and latching the bow to the clamp-supporting arms.

Projecting upwardly and laterally from the bow is a finger 222 suspendingly supporting a rod 223 pivotally connected with the link 210, and pressure on a treadle not shown operates a lever 224 to lift the bow as presently described to effect release of the detaining face of the crank 205 from one of the turret stop bosses 204.

The outer end of the lever is pivotally connected to a reciprocating bar 225 mounted on the head 7 and having a lug 226 engageable with a finger 227 projecting forwardly from the bow as shown in Figs. 2 and 3, whereby downward movement of the treadle will lift the bow to free the bow ear from the turret and rotate the turret to tension the coil spring as now described.

Turret-releasing movement of the bow causes the bow to operate against a roller 228 on one arm of a crank 229 pivotally supported on a pin 230 mounted in a bracket arm 231, and move a lateral roller 232 at the lower end of a crank arm 233 against the end of the pawl-supporting bracket to shift said bracket and effect spring-winding operation of the pawl. The rod slides in a squared opening in the bracket against the resistance of a coil spring 234 which returns the pawl-supporting bracket to retracted position.

Each movement of the treadle is preferably adapted to effect rotation of the ratchet a sufficient amount to tension the coil spring enough to rotate the turret 90° for bringing the next succeeding clamp into registering position with the needle, whereupon the stop crank again engages one of the stop bosses and holds the turret stationary.

An arm 235 depending from the bracket 202 supports a spring stop member 236 in the path of the turret lugs 204 to yieldingly engage the same when the lugs are engaged by the crank 205 to prevent reverse rotation of the turret, the stop yielding when the turret is actuated to permit the lug to pass.

The radial arms of the turret are overlapped and arranged transversely and connected with the upper plate of the turret by coil springs so that the spring-supported end of a cross arm registering with the needle may be depressed by the spring bow member into clamping relation with the garment.

In using the invention the feeder and turret elements will be provided in accordance with the type of machine to which it is applied and the character of buttons adapted to be sewed on garments thereby.

Buttons supplied to the hopper will be leveled by the agitating tube and leveling plates to form a tier in the chute and will be automatically rotatively adjusted for location of buttons in the clamps in suitable position for movement of the needle through the several eyes of the button in response to the operation of the machine.

Any button that may enter the chute and channels of the feeder in inverted position will automatically be turned over while passing to the turret and it is apparent that the turning mechanism including the feeler pin may be adapted to detect mal-adjustment and effect readjustment of buttons of any type having a recess or analogous differentiation in one face. In the illustrated structure, the buttons to be sewed have concave upper faces, into the recesses of which the feeler pin moves to permit the turning mechanism to operate, the turning mechanism being ineffective when the button is properly positioned in the discharge channel.

The several cam members operated by the main shaft of the feeder unit which in turn is operated by the actuating mechanism of the machine afford means for operating the several devices in synchronism or in suitable succession whereby the buttons are moved and positioned automatically and delivered in proper position to the clamp for movement to needle-receiving location, and the oscillating strip and bow are operated in time with the needle to effect synchronous operation of the holder.

What I claim and desire to secure by Letters Patent is:

1. In apparatus of the character described, in combination with a machine for attaching buttons, a button locating unit including a rotative turret, a frame having button holding clamps flexibly supported by the turret, and means for rotating the turret for locating buttons successively in attaching position during the interval between the operating steps of the machine.

2. In button feeding apparatus, a button locating unit including a rotative frame having button-holding clamps for supporting buttons in sewing position, and means for oscillating the frame in button sewing position.

3. Button-feeding apparatus including in combination with a sewing machine including a drive shaft, and a needle operated by said shaft, button-feeding mechanism including button inverting and button rotating means operated by said shaft, spring-pressed means receiving buttons from the feeding mechanism for delivery into receiving relation with the needle, automatically operating means for retaining said delivering means in needle receiving position, and means for coincidently releasing said delivery means and tensioning the spring thereof.

4. In combination with a button sewing machine, a turret rotatively supported by the machine, a button-supporting clamp flexibly supported by the turret and engageable therewith for rotation by said turret, a bow having an ear tending to engage said clamp to disengage the same from the turret and press the clamp on a garment or the like supported by the machine for attaching the button to the garment, and means for operating said bow to release said clamp and permit the clamp to engage the turret.

5. Button-feeding apparatus including in combination with a sewing machine including a drive shaft, and a needle operated by said shaft, button-feeding mechanism including button inverting and button rotating means operated by said shaft, spring-pressed means receiving buttons from the feeding mechanism for delivery into receiving relation with the needle, means for retaining said delivering means in needle receiving position, and means for coincidently releasing said delivery means and tensioning the spring thereof.

6. In combination with a button sewing machine having a work-shifting member, a turret rotatively supported by the machine, a button-supporting clamp flexibly supported by the turret and engageable therewith for rotation by said turret, means operable to disengage said clamp from the turret and press the clamp on a work piece to which the button is to be sewed, and means effecting vibration of the clamp in synchronism with the work-shifting member.

7. In combination with a button sewing machine, a turret rotatively supported by the machine, a button-supporting clamp engageable with the turret for rotation thereby to carry a button into sewing position, means for feeding a button into the clamp, and means operable to disengage said clamp from the turret when the button is in sewing position.

8. In combination with a button sewing machine, a turret rotatively supported by the machine, a button-supporting clamp engageable with the turret for rotation thereby to carry a button into sewing position, means for feeding a button into the clamp, means operable to disengage said clamp from the turret when the button is in sewing position, and means for effecting rotation of the turret operable by said disengaging means.

9. In combination with a machine of the character described, a turret rotatably supported by the machine, means for actuating the turret, a clamp-supporting member detachably supported by the turret, a button clamp on said member, means for feeding a button into said clamp, means for latching the turret against rotation during the button feeding operation, means for releasing the latching means to permit rotation of the turret to carry the button into sewing position, and means for detaching the clamp supporting member from the turret to press the button against a work piece to which the button is sewed.

10. In combination with a button sewing machine including a reciprocating needle and a vibratory work-supporting plate operable in synchronism with the needle, a rotatable member mounted on the machine, means for actuating the rotatable member, a clamp-supporting member detachably connected with the rotatable member to rotate therewith, a button-supporting clamp carried by said supporting member, means for feeding a button into said clamp, means for latching the rotatable member during feed of the button, means for releasing the latch to permit rotation of the rotatable member to carry the button into sewing position, means for detaching the clamp carrying member from the rotatable member including means for vibrating the clamp carrying member in synchronism with said plate.

11. In combination with a button sewing machine including a reciprocating needle and a vibratory work-supporting plate operable in synchronism with the needle, a rotatable member mounted on the machine, means for actuating the rotatable member, a clamp-supporting member detachably connected with the rotatable member to rotate therewith, a button-supporting clamp carried by said supporting member, means for feeding a button into said clamp, means for latching the rotatable member during feed of the button, means for releasing the latch to permit rotation of the rotatable member to carry the button into sewing position, means carried by said plate for detaching the clamp carrying member from the rotatable member including means for vibrating the clamp-carrying member in synchronism with said plate.

12. In combination with a button sewing machine including a reciprocating needle and a vibratory work-supporting plate operable in synchronism with the needle, a rotatable member mounted on the machine, a spring for actuating the rotatable member, a clamp-supporting member detachably connected with the rotatable member to rotate therewith, a button-supporting clamp carried by said supporting member, means for feeding a button into said clamp, means for latching the rotatable member during feed of the button, means for releasing the latch to permit rotation of the rotatable member to carry the button into sewing position, means for detaching the clamp carrying member from the rotatable member including means for vibrating the clamp carrying member in synchronism with said plate.

13. In combination with a button sewing machine including a reciprocating needle and a vibratory work-supporting plate operable in synchronism with the needle, a rotatable member mounted on the machine, a spring for actuating the rotatable member, a clamp-supporting member detachably connected with the rotatable member to rotate therewith, a button-supporting clamp carried by said supporting member, means for feeding a button into said clamp, means for latching the rotatable member during feed of the button, means for releasing the latch to permit rotation of the rotatable member to carry the button into sewing position, means for detaching the clamp carrying member from the rotatable member including means for vibrating the clamp carrying member in synchronism with said plate, and means operable by said detaching means for tensioning said spring.

14. In combination with a button attaching machine and means for turning and positioning a button for delivery to the machine, a button clamp carrying member associated with the machine, a button clamp member detachably supported by said carrying member, means associated with the button turning and positioning means for feeding a positioned button to said clamp member, means for moving the clamp carrying member to carry the button from said positioning and turning means to button attaching position, and means for detaching the clamp member from the carrying means while the button is in attaching position.

15. In combination with a button sewing machine and means for turning and positioning a button for delivery to the sewing machine, a button clamp carrying member associated with the sewing machine, a button clamp member detachably carried by said carrying member, means associated with the button turning and positioning means for feeding a positioned button into the clamp member, means for moving the clamp carrying member to carry the button from said button positioning and turning means to button sewing position, means for detaching the clamp member from the carrying means while the button is in sewing position, and means for locking the carrying member against movement during operation of the button feeding means and while the clamp member is in detached position.

16. In combination with a button sewing machine, a turret rotatably associated with the machine, a button supporting clamp member engageable with the turret to be moved thereby, means for turning and positioning a button for delivery to the clamp member operable in timed relation with the sewing machine, means for feeding the positioned button to the clamp member, means for rotating the turret to carry the button into sewing position, and means for disengaging the clamp member from the turret when the button is in sewing position.

17. Button feeding apparatus in combination with a sewing machine including a driving member and a needle operated by said driving member, button feeding mechanism including button turning and button rotating means operated by said driving member, means receiving buttons from the feeding mechanism for delivery into receiving relation with a needle, a spring for operating said button delivering means, means for retaining said delivery means in needle receiving position, and means for coincidently releasing said delivery means and tensioning said spring for returning said receiving means to button receiving position relatively to said feeding mechanism.

18. In combination with a button sewing machine including a reciprocating needle and a vibratory work supporting member operable in synchronism with the needle, a clamp carrying member associated with the sewing machine, a button clamp member detachably connected with said clamp carrying member, a button supporting clamp carried by said clamp member, means for feeding a button into said clamp, means for latching said clamp supporting member during feed of the button, means for releasing the latching means, and means for rotating said member to carry the button into sewing position, and means for detaching the clamp member from the clamp carrying member including means for vibrating the clamp member in synchronism with said vibratory work supporting member.

19. In a machine of the character described, a button hopper, means for delivering buttons from the hopper, means for receiving the buttons individually from the button delivery means, centering pins for engaging the periphery of the button to move it into a fixed position in the receiving means, a presser member movable into engagement with a face of the button to prevent movement of the button relative to said pins, a feeler member operable below the button and movable to engage the opposite face of the button, means controlled by the feeler member for inverting the button, a button delivery member for delivering buttons to an attaching position, means for moving the inverted button into the button delivery member, means operable in synchronism with the button moving means for rotatably positioning the button in the button delivery means, and means for actuating the button delivery means to carry the button to attaching position.

20. An apparatus of the character described in combination with a machine for attaching buttons, a button locating unit including a rotative turret, a frame releasably supported by the turret, a button holding clamp on the frame, means for rotating the turret for locating a button in attaching position, and means for releasing the frame from the turret during operation of the button attaching machine.

21. Button feeding apparatus in combination with a button attaching machine including a driving member, means operated by said driving member for attaching a button, button feeding mechanism including button inverting means operated by said driving member, means receiving buttons from the feeding mechanism for delivery into receiving relation with the button attaching means, means for moving said receiving means to button attaching position, means for retaining said receiving means in button attaching position, and means for releasing said receiving means after the button is attached to render it operative for delivering another button.

22. In combination with a button attaching machine, a button clamp carrying member associated with the machine, a button clamp carried by said carrying member, means operable by the machine for feeding a button into the clamp, means for rotatably positioning the button in the clamp, means for moving the clamp carrying member to carry the button to attaching position, and means for retaining said button clamp in button attaching position while the button is being attached.

23. In combination with a button attaching machine, a buttton clamp, means for feeding a button into the clamp, means for rotating the button while in the clamp to position the button relative to the clamp, means for moving the clamp to button attaching position, and means for retaining the clamp in button attaching position while the button is being attached.

24. In an apparatus of the character described in combination with a machine for attaching buttons, a button locating unit associated with the machine including a rotatable turret, a plurality of clamp carrying members releasably carried by the turret, button clamps fixed to the clamp carrying members, means for intermittently rotating the turret to successively bring the clamps into button sewing position, means for successively feeding buttons into the clamps between movements of the turret, and means for releasing the clamp carrying members from the turret when in button attaching position.

25. In an apparatus of the character described in combination with a machine for attaching buttons, a button locating unit associated with the machine including a rotatable turret, a plurality of clamp carrying members releasably carried by the turret, button clamps fixed to the clamp carrying members, means for intermittently rotating the turret to successively bring the clamps into button sewing position, means for successively feeding buttons into the clamps between movements of the turret, means for releasing the clamp carrying members from the turret when in button attaching position, and means for latching the turret against rotation between operations of said rotating means.

26. In apparatus of the character described including a hopper, a discharge guide, and a plunger operating in the guide for advancing a button received by the guide from the hopper, a slotted agitator tube, means supporting the tube for movement into and out of the hopper, means for actuating the tube, blades associated with the hopper, and means for alternately moving the blades over the top of the retracted tube and through the slot of said tube when the same is in the hopper for leveling buttons for reception by the guide.

27. In combination with a button attaching machine, a button clamp, means for feeding a button into the clamp, means for rotating the button relatively to the clamp for positioning eyes of the button in predetermined relation, means for bodily moving the clamp from button locating position to button attaching position, and means for retaining the clamp in button attaching position while the button is being attached.

28. In combination with a button sewing machine and means for turning and positioning a button for delivery to the sewing machine, a button clamp carrying member associated with the sewing machine, a button clamp member carried by the carrying member, means associated with the button turning and positioning means for feeding a positioned button into the clamp member, and means for moving the clamp carrying member to carry the button from said button positioning and turning means to button sewing position.

CLARENCE E. VAUGHAN.